United States Patent
Manolakos et al.

(10) Patent No.: US 11,910,392 B2
(45) Date of Patent: Feb. 20, 2024

(54) REQUEST OF NO-DOWNLINK-SCHEDULING GAPS AND SOUNDING REFERENCE SIGNAL (SRS) POSITIONING TRANSMISSION FOR PRIORITIZED AND EFFICIENT POSITIONING REFERENCE SIGNAL (PRS) PROCESSING

(71) Applicant: QUALCOMM Incorporated, San Diego, CA (US)

(72) Inventors: Alexandros Manolakos, Escondido, CA (US); Mukesh Kumar, Hyderabad (IN); Guttorm Ringstad Opshaug, Redwood City, CA (US); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/374,580

(22) Filed: Jul. 13, 2021

(65) Prior Publication Data

US 2022/0039135 A1 Feb. 3, 2022

Related U.S. Application Data

(60) Provisional application No. 63/059,139, filed on Jul. 30, 2020.

(51) Int. Cl.
*H04W 72/21* (2023.01)
*H04W 24/08* (2009.01)
(Continued)

(52) U.S. Cl.
CPC .......... *H04W 72/21* (2023.01); *H04L 5/0051* (2013.01); *H04W 24/08* (2013.01); *H04W 72/0453* (2013.01)

(58) Field of Classification Search
CPC ............. H04W 72/1284; H04W 24/08; H04W 72/0453; H04W 48/14; H04L 5/0051;
(Continued)

(56) References Cited

U.S. PATENT DOCUMENTS

| 2019/0053280 A1* | 2/2019 | Rico Alvarino .... H04W 64/003 |
| 2019/0230619 A1* | 7/2019 | Cui ........................ H04W 24/10 |

(Continued)

OTHER PUBLICATIONS

Keating et al., "Overview of Positioning in 5G New Radio", 2019, IEEE Xplore (Year: 2019).*
(Continued)

*Primary Examiner* — Justin T Van Roie
(74) *Attorney, Agent, or Firm* — QUALCOMM Incorporated

(57) ABSTRACT

Disclosed are various techniques for wireless communication. In an aspect, a user equipment (UE) transmits, to a serving base station, in one or more active bandwidth parts (BWPs) of the UE, a request for a no-downlink-scheduling gap, the request including at least time-domain parameters related to scheduling the no-downlink-scheduling gap, receives, from a neighboring base station, in the one or more active BWPs, a downlink positioning reference signal (DL-PRS) during the no-downlink-scheduling gap, and transmits, in the one or more active BWPs, an uplink positioning reference signal (UL-PRS) during the no-downlink-scheduling gap in response to reception of the DL-PRS.

28 Claims, 18 Drawing Sheets

(51) Int. Cl.
H04L 5/00 (2006.01)
H04W 72/0453 (2023.01)

(58) Field of Classification Search
CPC ... H04L 5/0055; H04L 5/0048; H04L 5/0094; H04L 5/0044; H04L 5/005; H04L 5/0053; H04L 5/0057; H04L 5/001
See application file for complete search history.

(56) References Cited

U.S. PATENT DOCUMENTS

| | | | | |
|---|---|---|---|---|
| 2021/0029507 | A1* | 1/2021 | Khoryaev | H04L 5/0069 |
| 2021/0144735 | A1* | 5/2021 | Manolakos | H04W 72/1263 |
| 2021/0352613 | A1* | 11/2021 | Yoon | H04L 5/0032 |
| 2022/0182200 | A1* | 6/2022 | Qi | H04W 64/00 |
| 2022/0317230 | A1* | 10/2022 | Manolakos | H04W 24/10 |

OTHER PUBLICATIONS

Keating et al., "Opportunities and Challenges for NR RAT-dependent based Positioning", 2019, IEEE Xplore (Year: 2019).*

Huawei, et al., "Discussion on RSTD Measurement", 3GPP Draft, R4-1914954, 3GPP TSG-RAN WG4 Meeting #93, vol. RAN WG4, No. Reno, US, Nov. 18, 2019-Nov. 22, 2019, Nov. 8, 2019 (Nov. 8, 2019), XP051819235, pp. 1-6, Retrieved from the Internet: URL:https://ftp.3gpp.org/tsg_ran/WG4_Radio/TSGR4_93/Docs/R4-1914954.zip, R4-1914954.doc [retrieved on Nov. 8, 2019] Sections 1-3.
Intel Corporation: "Discussion on UE PRS Processing Behavior", 3GPP Draft, R4-2000388, 3GPP TSG-RAN WG4 Meeting #94-e, vol. Ran WG4. No. Electronic Meeting, Feb. 24, 2020-Mar. 6, 2020, Feb. 14, 2020 (Feb. 14, 2020), XP051850423, 6 Pages, Retrieved from the Internet: URL:https://ftp.3gpp.org/tsg_ran/WG4_Radio/TSGR4_94_e/Docs/R4-2000388.zip R4-2000388 NR BWP-UE-behaivor LS r1.doc [retrieved on Feb. 14, 2020] Sections 1-3.
International Search Report and Written Opinion—PCT/US2021/041631—ISA/EPO—dated Dec. 1, 2021.
OPPO: "Remaining Issues on Measurements for NR Positioning", 3GPP Draft, R1-2001733, 3GPP TSG RAN WG1 #100bis, vol. RAN WG1. No. e-Meeting, Apr. 20, 2020-Apr. 30, 2020, Apr. 10, 2020 (Apr. 10, 2020), XP051873307, 3 Pages, Retrieved from the Internet: URL:https://ftp.3gpp.org/tsg_ran/WG1_RL1/TSGR1_100b_e/Docs/R1-2001733.zip, R1-2001733.docx [retrieved on Apr. 10, 2020] Sections 1-2.

* cited by examiner

| Slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Type | D | D | D | S | U | D | D | D | S | U | D | D | D | S | U |
| DL-PRS |  |  | 1 | 1 |  | 1 | 1 |  |  |  |  |  |  |  |  |
| MG | 1 | 1 | 1 | 1 | 1 | 1 | 1 | 1 | 1 | 1 | 1 | 1 |  |  |  |

FIG. 8

| Slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Type | D | D | D | S | U | D | D | D | S | U | D | D | D | S | U |
| DL-PRS | | | 1 | 1 | | 1 | 1 | | | | | | | | |
| No-DL-Sch GP | 0 | 0 | 1 | 1 | 0 | 1 | 1 | 0 | 0 | 0 | 0 | 0 | | | |

REQUEST OF NO-DOWNLINK-SCHEDULING GAPS AND SOUNDING REFERENCE SIGNAL (SRS) POSITIONING TRANSMISSION FOR PRIORITIZED AND EFFICIENT POSITIONING REFERENCE SIGNAL (PRS) PROCESSING

CROSS-REFERENCE TO RELATED APPLICATIONS

The present application for patent claims the benefit of U.S. Provisional Application No. 63/059,139, entitled "REQUEST OF NO-DOWNLINK-SCHEDULING GAPS AND SOUNDING REFERENCE SIGNAL (SRS) POSITIONING TRANSMISSION FOR PRIORITIZED AND EFFICIENT POSITIONING REFERENCE SIGNAL (PRS) PROCESSING," filed Jul. 30, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting, to a serving base station, in one or more active bandwidth parts (BWPs) of the UE, a request for a no-downlink-scheduling gap, the request including at least time-domain parameters related to scheduling the no-downlink-scheduling gap; receiving, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

In an aspect, a method of wireless communication performed by a base station includes receiving, from a UE, in one or more active BWPs of the UE, a request for a no-downlink-scheduling gap, the request including at least time-domain parameters of the no-downlink-scheduling gap; and refraining from transmitting to the UE during the no-downlink-scheduling gap.

In an aspect, a UE includes a memory; at least one transceiver; and at least one processor communicatively coupled to the memory and the at least one transceiver, the at least one processor configured to: cause the at least one transceiver to transmit, to a serving base station, in one or more active BWPs of the UE, a request for a no-downlink-scheduling gap, the request including at least time-domain parameters related to scheduling the no-downlink-scheduling gap; and receive, from a neighboring base station via the at least one transceiver, in the one or more active BWPs, a DL-PRS during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

In an aspect, a base station includes a memory; at least one transceiver; and at least one processor communicatively coupled to the memory and the at least one transceiver, the at least one processor configured to: receive, from a UE, in one or more active BWPs of the UE, a request for a no-downlink-scheduling gap, the request including at least time-domain parameters of the no-downlink-scheduling gap; and cause the at least one transceiver to refrain from transmitting to the UE during the no-downlink-scheduling gap.

In an aspect, a UE includes means for transmitting, to a serving base station, in one or more active BWPs of the UE, a request for a no-downlink-scheduling gap, the request including at least time-domain parameters related to scheduling the no-downlink-scheduling gap; and means for receiving, from a neighboring base station, in the one or more active BWPs, a DL-PRS during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

In an aspect, a base station includes means for receiving, from a UE, in one or more active BWPs of the UE, a request for a no-downlink-scheduling gap, the request including at least time-domain parameters of the no-downlink-scheduling gap; and means for refraining from transmitting to the UE during the no-downlink-scheduling gap.

In an aspect, a non-transitory computer-readable medium stores computer-executable instructions includes computer-executable instructions comprising: at least one instruction instructing a UE to transmit, to a serving base station, in one or more active BWPs of the UE, a request for a no-downlink-scheduling gap, the request including at least time-domain parameters related to scheduling the no-downlink-scheduling gap; and at least one instruction instructing the UE to receive, from a neighboring base station, in the one or more active BWPs, a DL-PRS during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

In an aspect, a non-transitory computer-readable medium stores computer-executable instructions includes computer-executable instructions comprising: at least one instruction instructing a base station to receive, from a UE, in one or more active BWPs of the UE, a request for a no-downlink-scheduling gap, the request including at least time-domain parameters of the no-downlink-scheduling gap; and at least one instruction instructing the base station to refrain from transmitting to the UE during the no-downlink-scheduling gap.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 is a diagram of an example sequence of slots in which DL-PRS and measurement gaps are configured.

FIG. 9 is a diagram of an example sequence of slots in which DL-PRS and no-downlink-scheduling gaps are configured.

DETAILED DESCRIPTION

Figure 1:
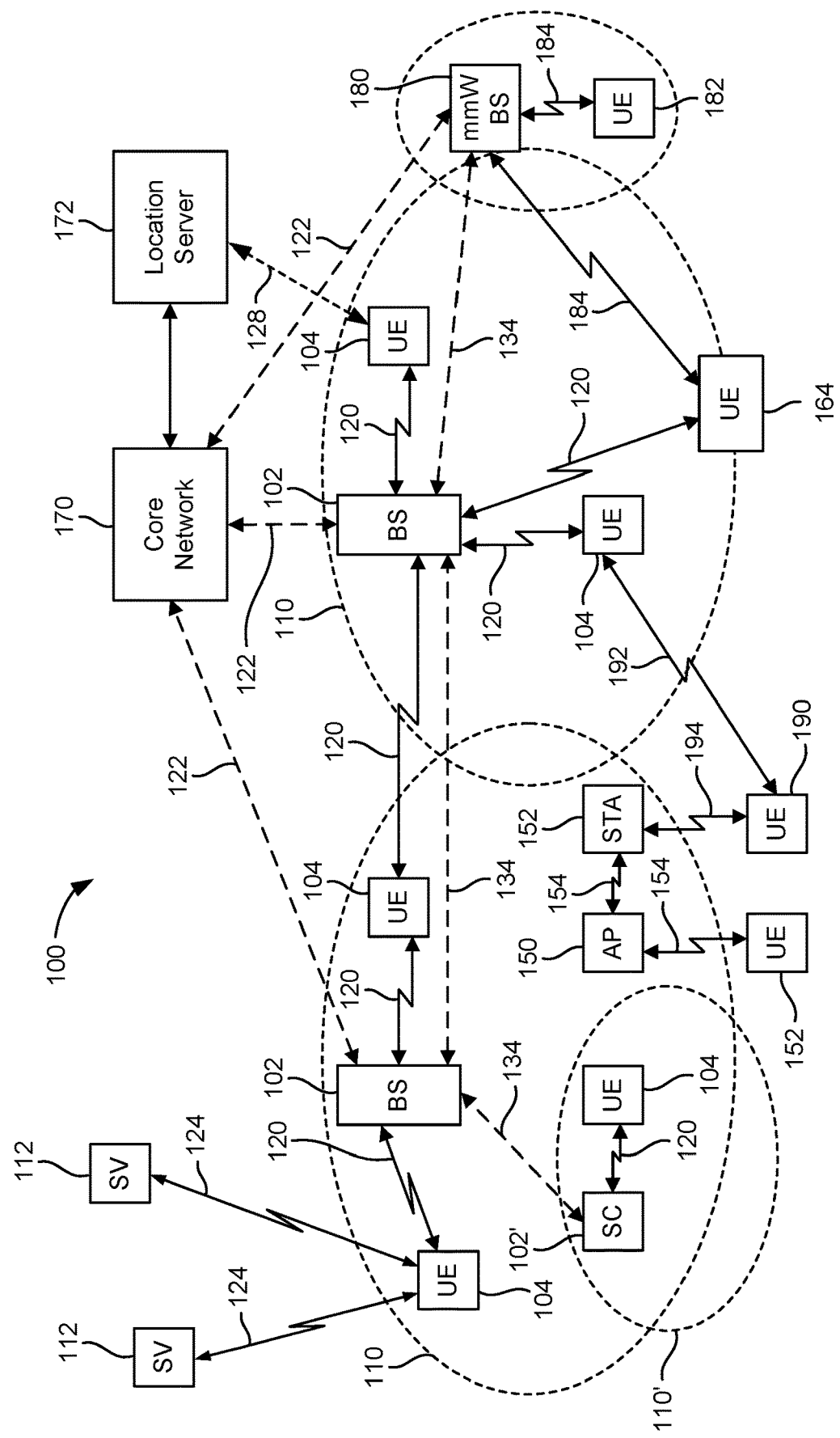
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
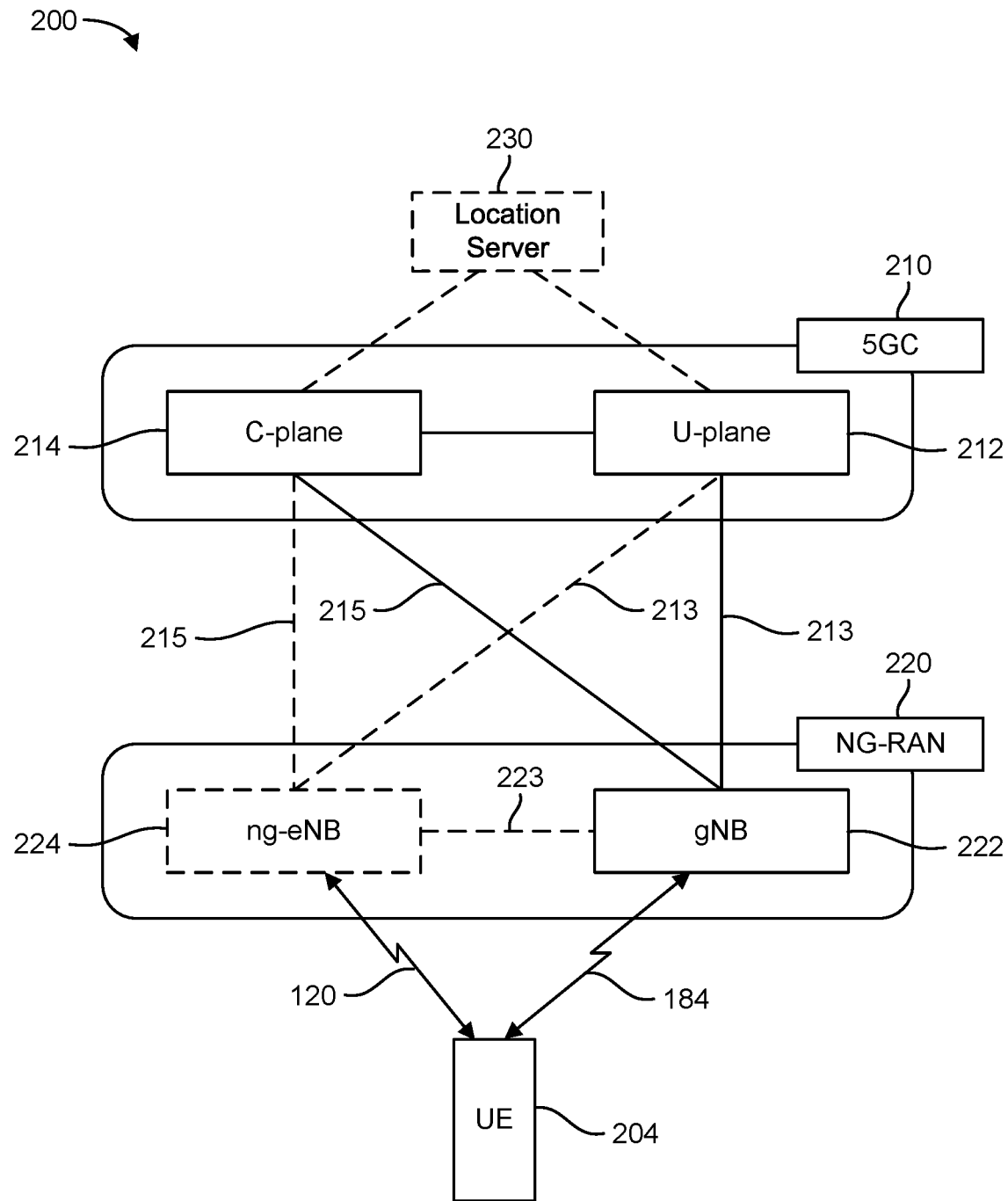
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
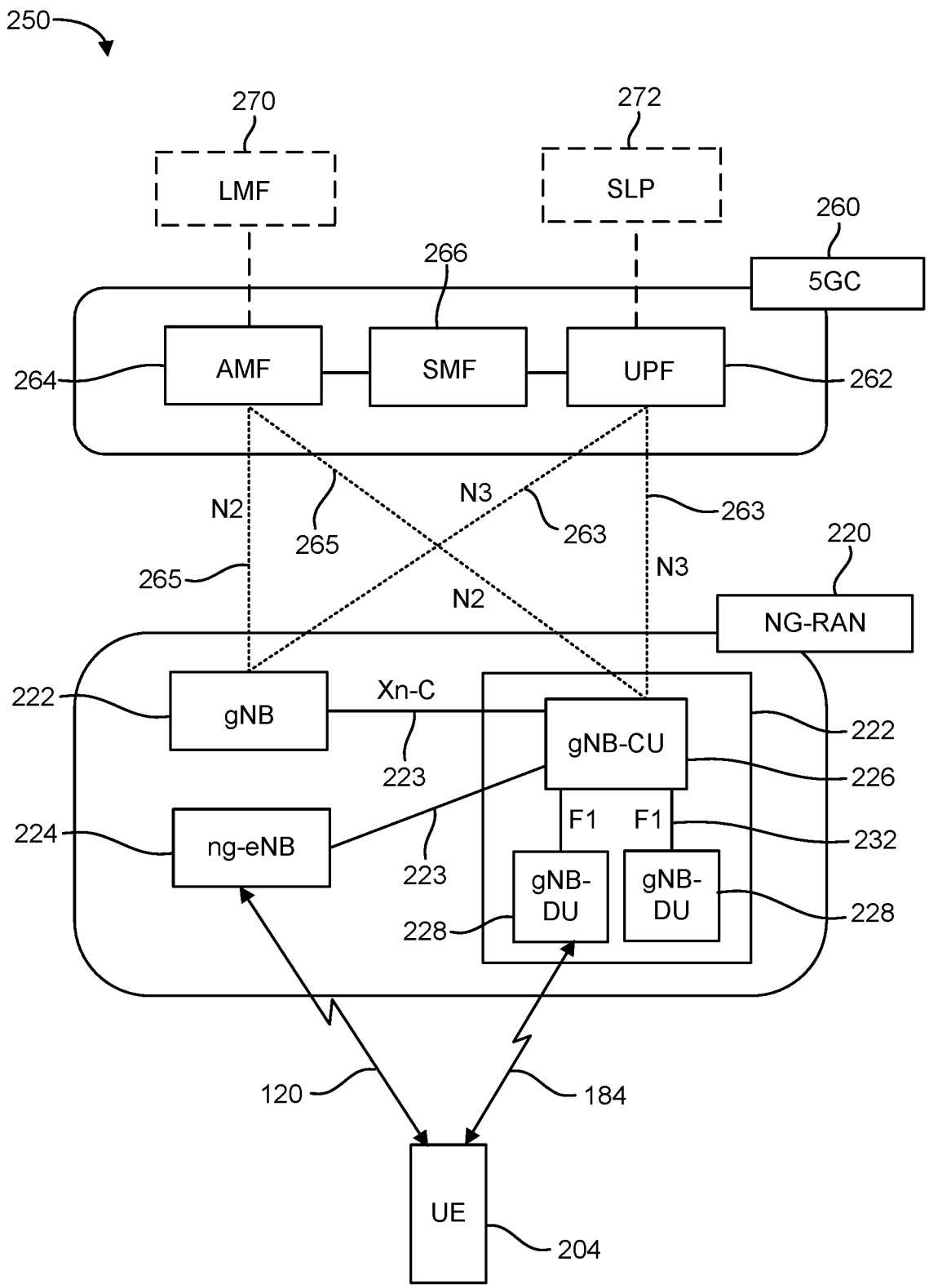

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
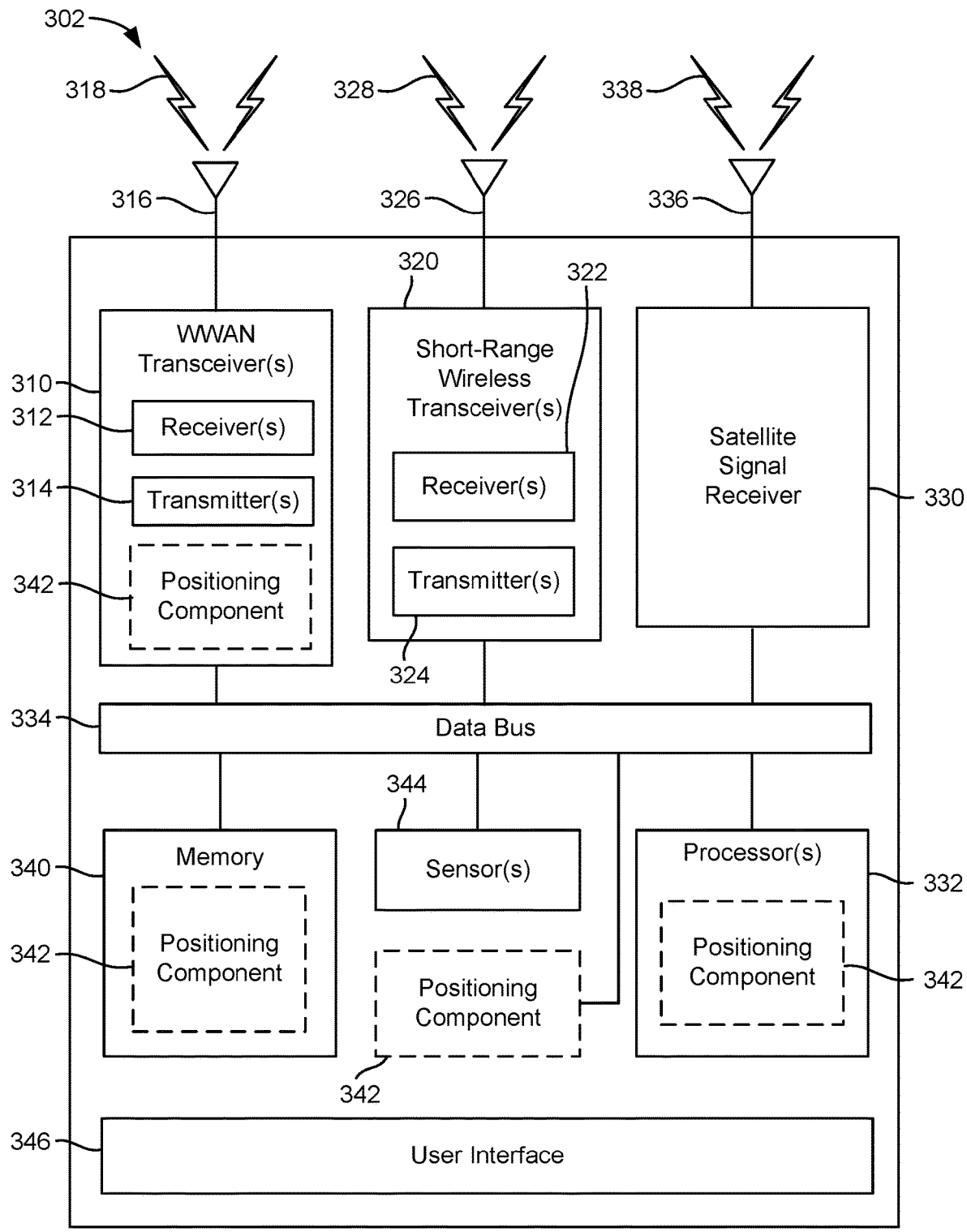
FIGS. 3A, 3B, and 3C are simplified block diagrams of several sample aspects of components that may be employed in a user equipment (UE), a base station, and a network entity, respectively, and configured to support communications as taught herein.
Figure 3B:
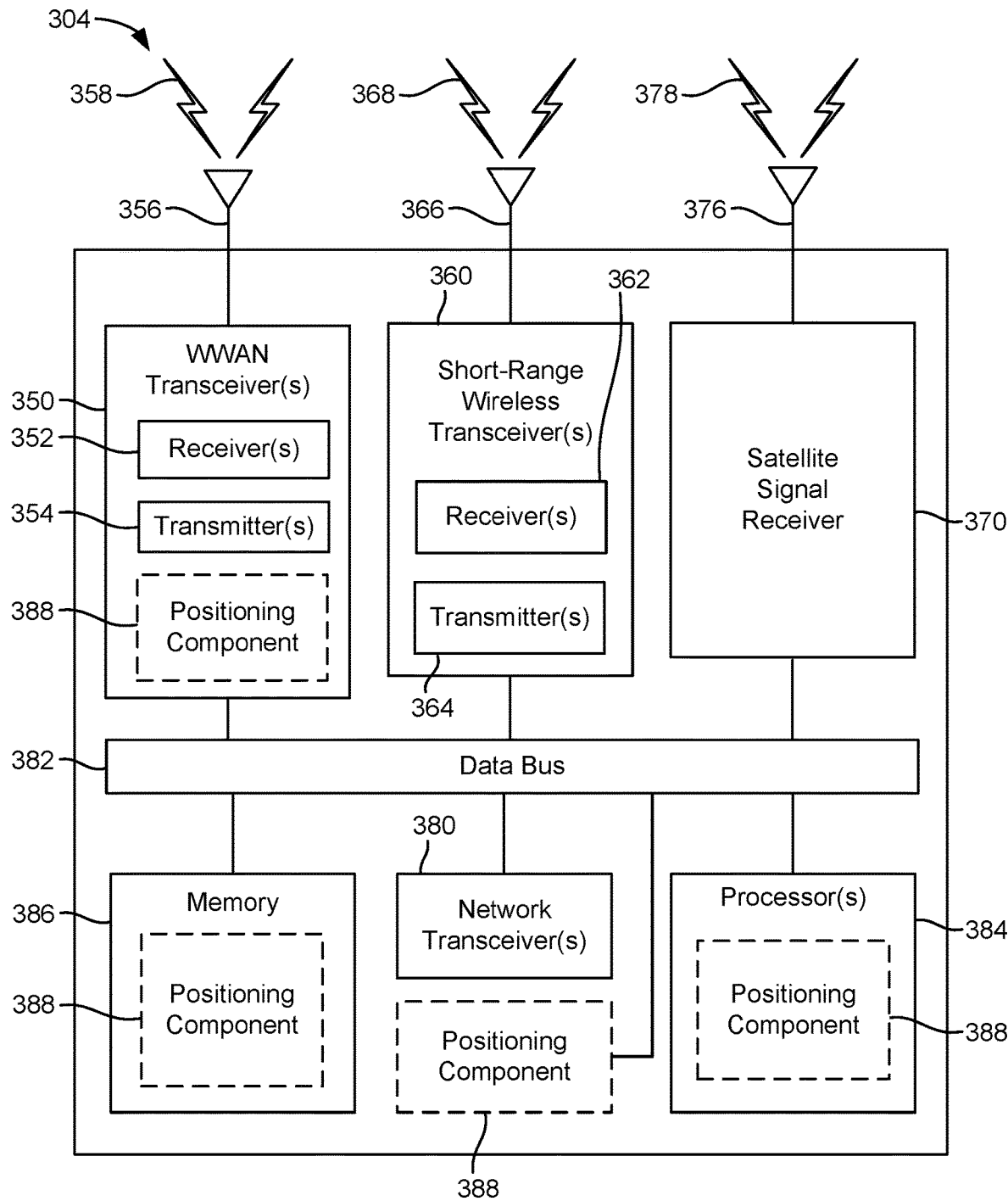
Figure 3C:
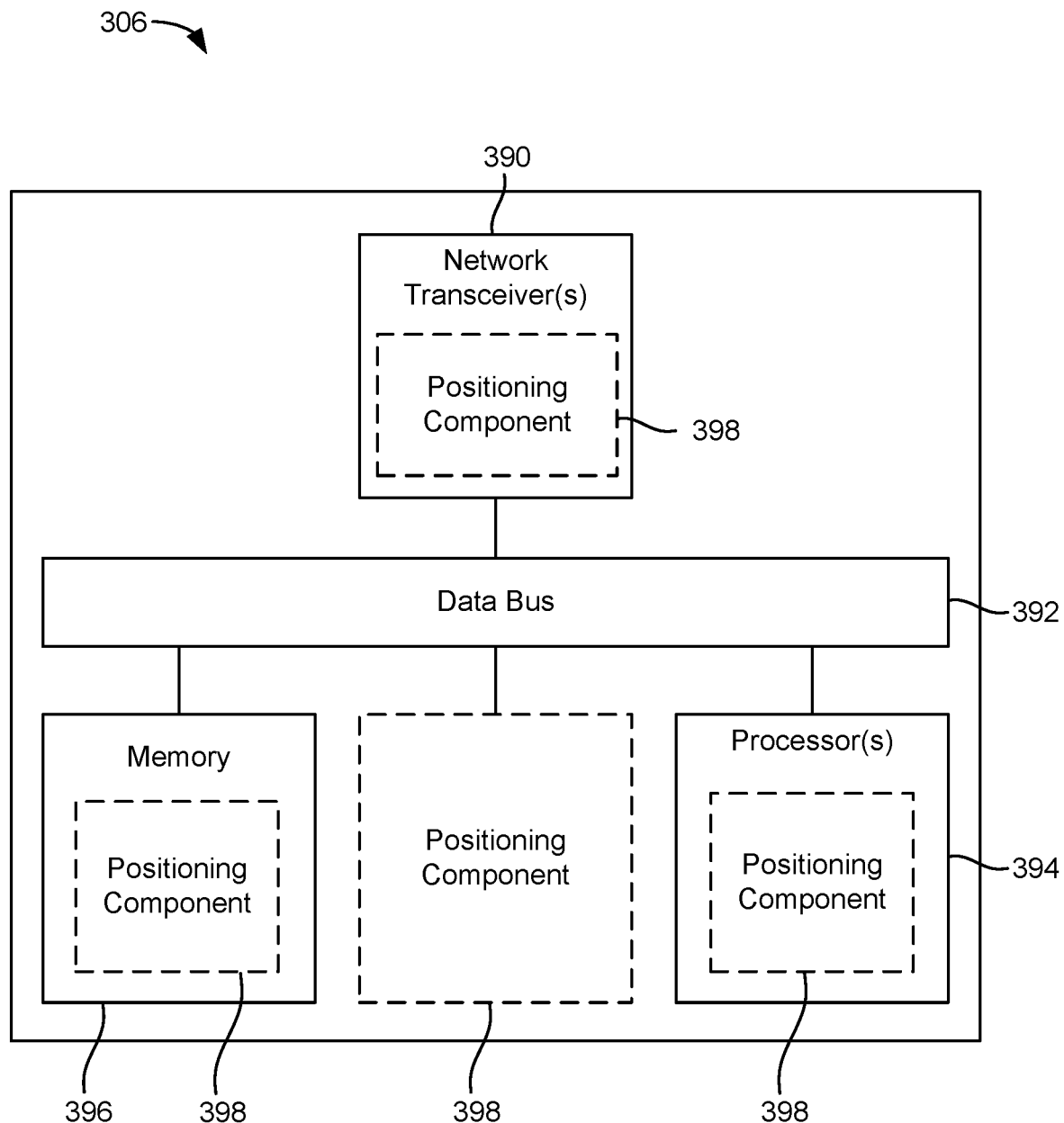

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be determined (e.g., using multilateration) based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
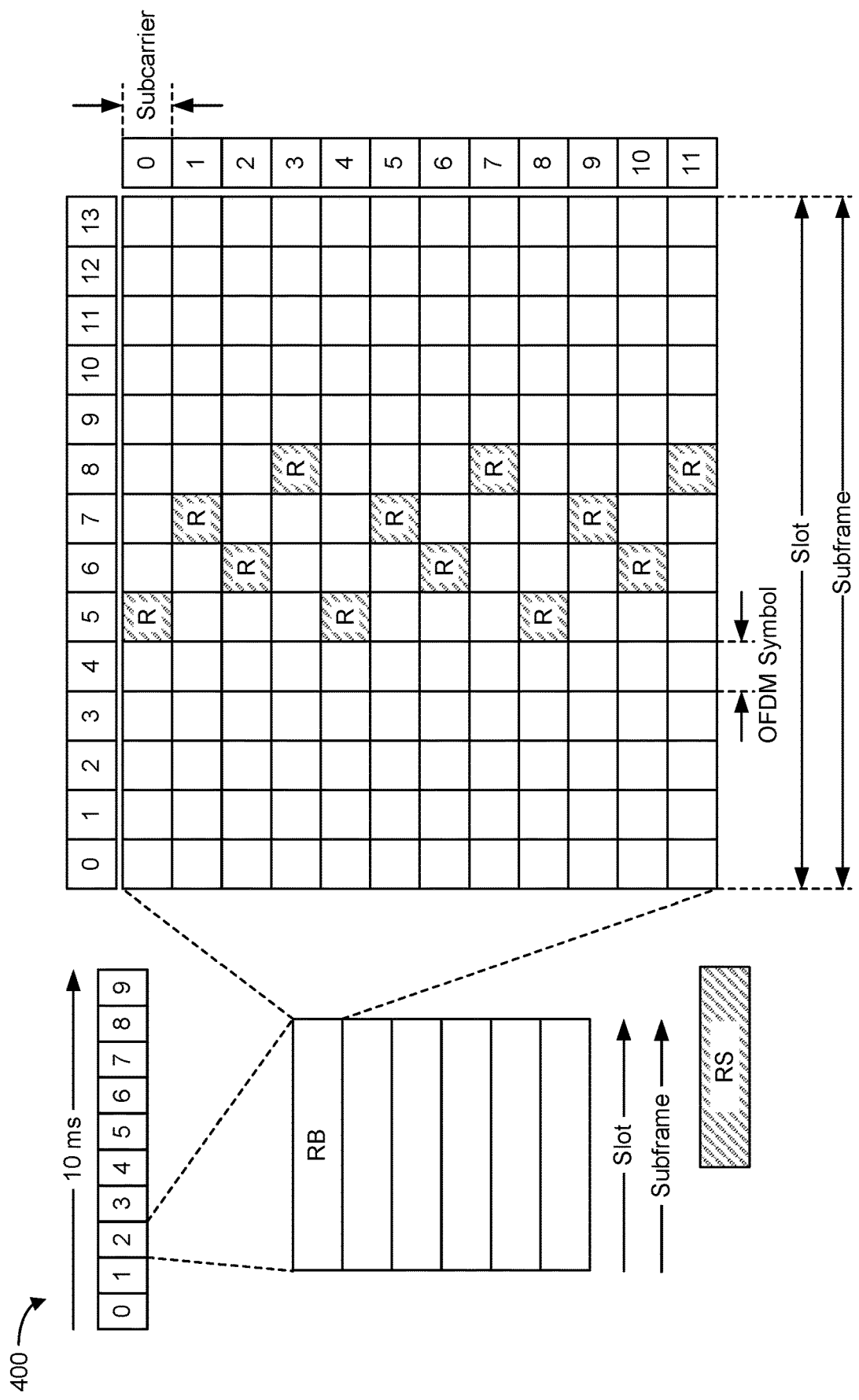
FIG. 4A is a diagram illustrating an example frame structure, according to aspects of the disclosure.

Various frame structures may be used to support downlink and uplink transmissions between network nodes (e.g., base stations and UEs). FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4A); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 4B:
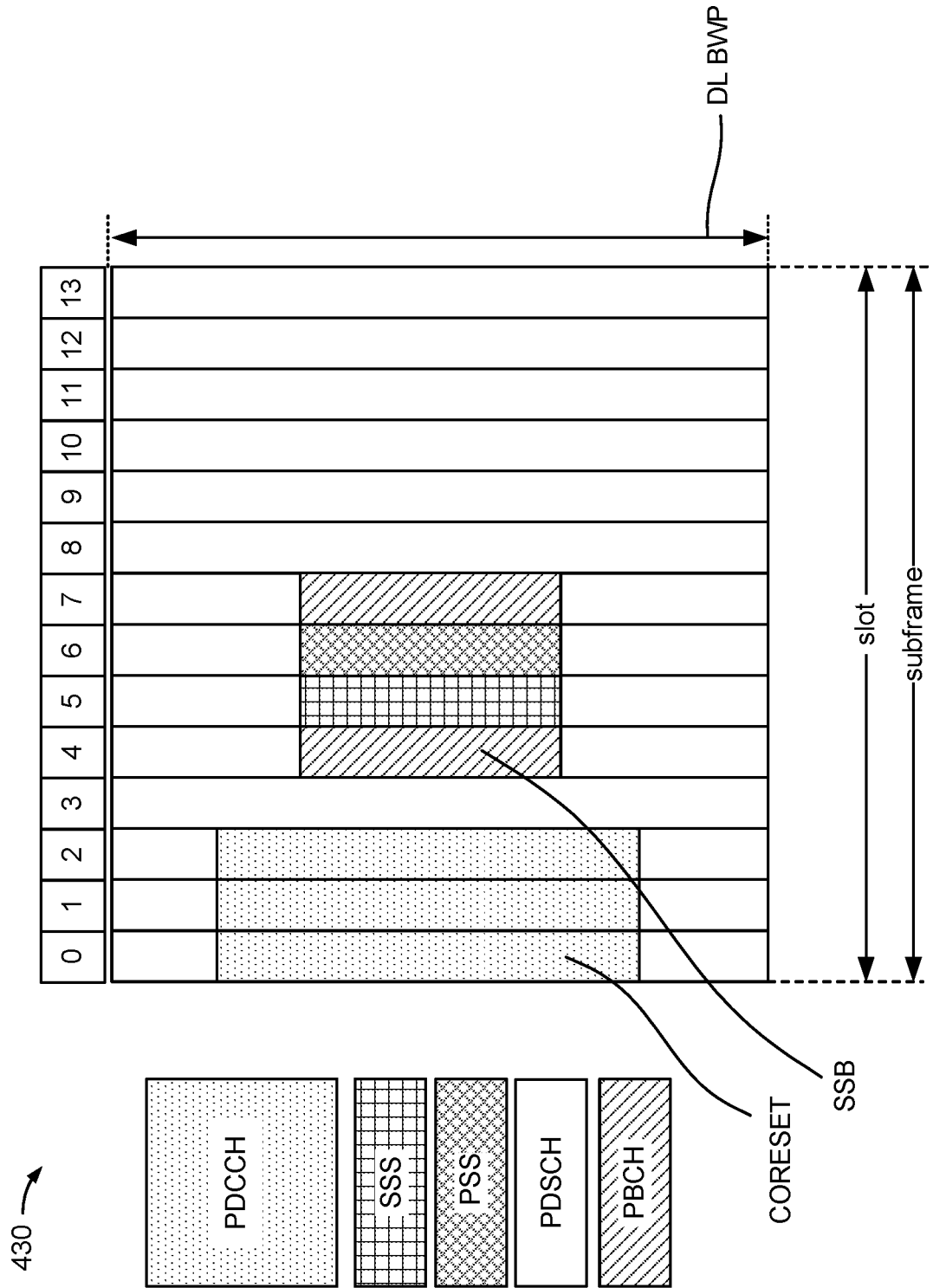
FIG. 4B is a diagram illustrating various downlink channels within an example downlink slot, according to aspects of the disclosure.

FIG. 4B is a diagram 430 illustrating various downlink channels within an example downlink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

In an aspect, the reference signal carried on the REs labeled "R" in FIG. 4A may be SRS.

SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4A, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4A); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or DCI).

Figure 4C:
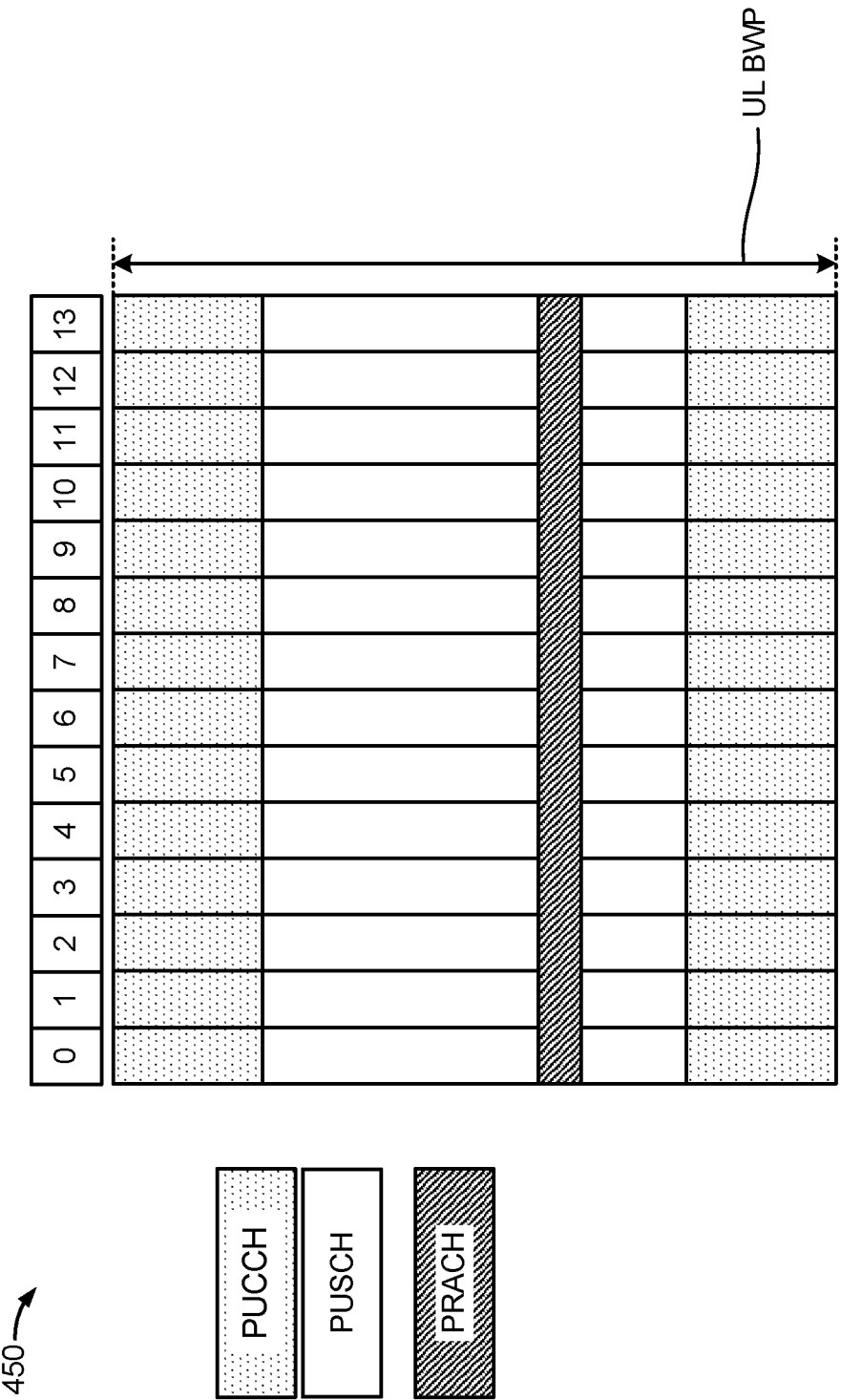
FIG. 4C is a diagram illustrating various uplink channels within an example uplink slot, according to aspects of the disclosure.

FIG. 4C is a diagram 450 illustrating various uplink channels within an example uplink slot. In FIG. 4C, time is represented horizontally (on the X axis) with time increasing from left to right, while frequency is represented vertically (on the Y axis) with frequency increasing (or decreasing) from bottom to top. In the example of FIG. 4C, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
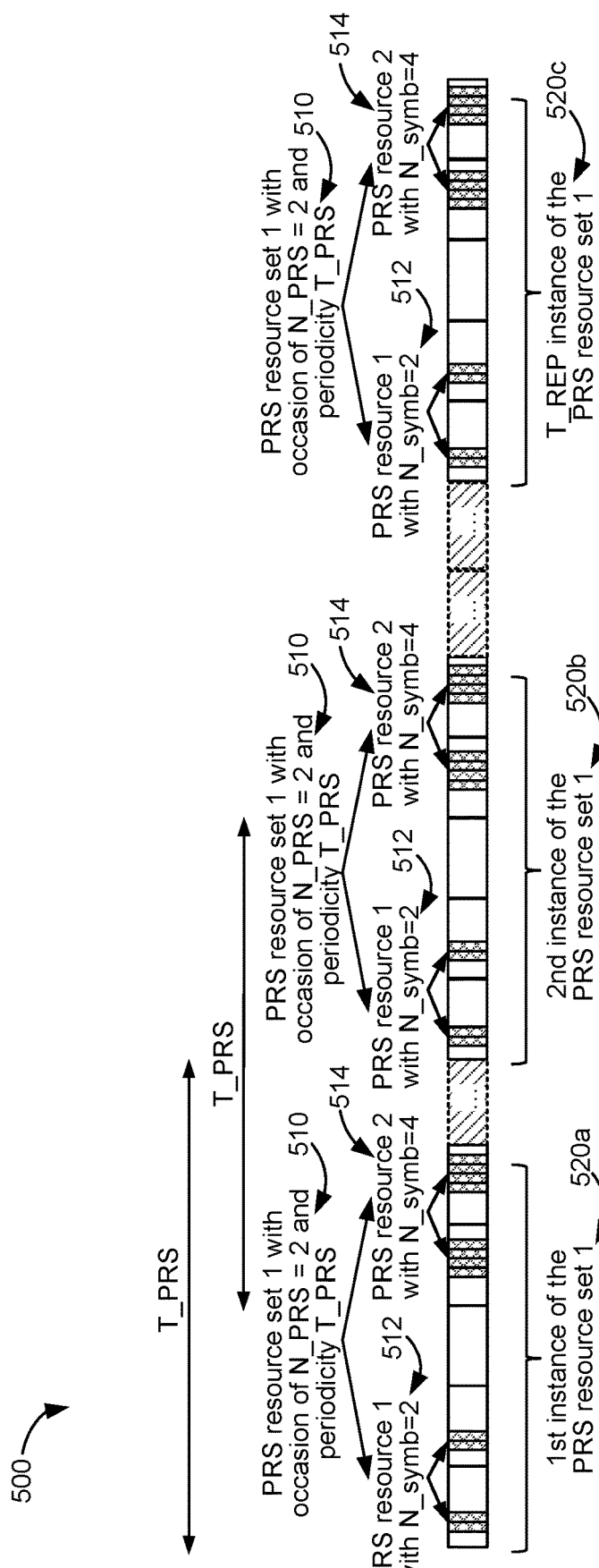
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520a, 520b, and 520c, includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520a, 520b, and 520c of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

There are various UE capabilities related to the processing and buffering requirements of DL-PRS. DL-PRS can be configured and scheduled to match the processing capabilities of the UE that will be measuring the DL-PRS, or the UE may only be expected to measure the portion of the DL-PRS that it is capable of measuring. One parameter of a DL-PRS that may be configured based on UE capability includes a limit on the maximum number of DL-PRS resources configured to the UE for all TRPs within a measurement window. Another is the duration of DL-PRS symbols (in units of milliseconds) that a UE can process every T ms, assuming a maximum PRS bandwidth. These parameters are illustrated below in Table 1 for LTE and NR.

TABLE 1

| Parameter | LTE PRS Baseline | NR PRS |
| --- | --- | --- |
| Number of PRS resources per TRP | Each TRP can configure 1 PRS resource every T ms | Each TRP can configure X PRS resources every T ms Example: X = 64 for FR2, X = 8 for FR1 time division duplex (TDD) |
| FFT size | 2K | 4K |
| Number of OFDM symbols with PRS per PRS resource | 8 symbols per subframe with repetition over 6 subframes | Up to 12 symbols per slot with repetition of 32 slots |

The following table illustrates additional parameters of DL-PRS that may be configured based on the UE's capabilities.

TABLE 2

| Description | Maximum number for DL-PRS resources | Value that can be signaled as part of UE capability |
| --- | --- | --- |
| Maximum number of frequency layers (X1) | X1 = 4 | Values = {1, 4} |
| Maximum number of TRPs per frequency layer | X2 = 64 | |
| Maximum number of PRS resource sets per TRP (X3) per frequency layer | X3 = 2 | Values = {1, 2} |
| Maximum number of resources per PRS resource set (X4) | X4 = 64 | |
| Maximum number of DL-PRS resources per UE (X5) | NA | |
| Maximum number of TRPs for all frequency layers (X6) per UE | 256 | |
| Maximum number of resources per frequency layer (X7) | NA | |

A UE may report the following parameters to indicate its DL-PRS processing capabilities.

The duration of DL-PRS symbols in units of milliseconds that the UE can process every T ms (assuming maximum DL-PRS bandwidth in MHz), which depends on the frequency range. For FR1 bands, the duration (in milliseconds) may be selected from the set of {5, 10, 20, 40, 50, 80, 100}. For FR2 bands, the duration (in milliseconds) may be selected from the set of {50, 100, 200, 400}. T may be selected from the set of {8, 16, 20, 30, 40, 80, 160, 320, 640, 1280}. N is the duration of DL-PRS symbols in units of milliseconds and may be selected from the set of {0.125, 0.25, 0.5, 1, 2, 4, 8, 12, 16, 20, 25, 30, 35, 40, 45, 50}.

The maximum number of positioning frequency layers supported by the UE. The value may be selected from the set of {1, 2, 3, 4}.

The maximum number of DL-PRS resources that the UE can process in a slot. For FR1 bands, the maximum number of DL-PRS resources may be selected from the set of {1, 2, 4, 8, 16, 32, 64} for each SCS (specifically, 15 kHz, 30 kHz, and 60 kHz). For FR2 bands, the maximum number of DL-PRS resources may be selected from the set of {1, 2, 4, 8, 16, 32, 64} for each SCS (specifically, 15 kHz, 30 kHz, and 60 kHz).

The above parameters are reported assuming a configured measurement gap and a maximum ratio of measurement gap length (MGL) to measurement gap repetition period (MGRP) of no more than some 'X' percent. A measurement gap is a configured period of time during which the serving cell refrains from transmitting to the UE so that the UE can receive transmissions (e.g., downlink reference signals) from other cells.

Figure 6:
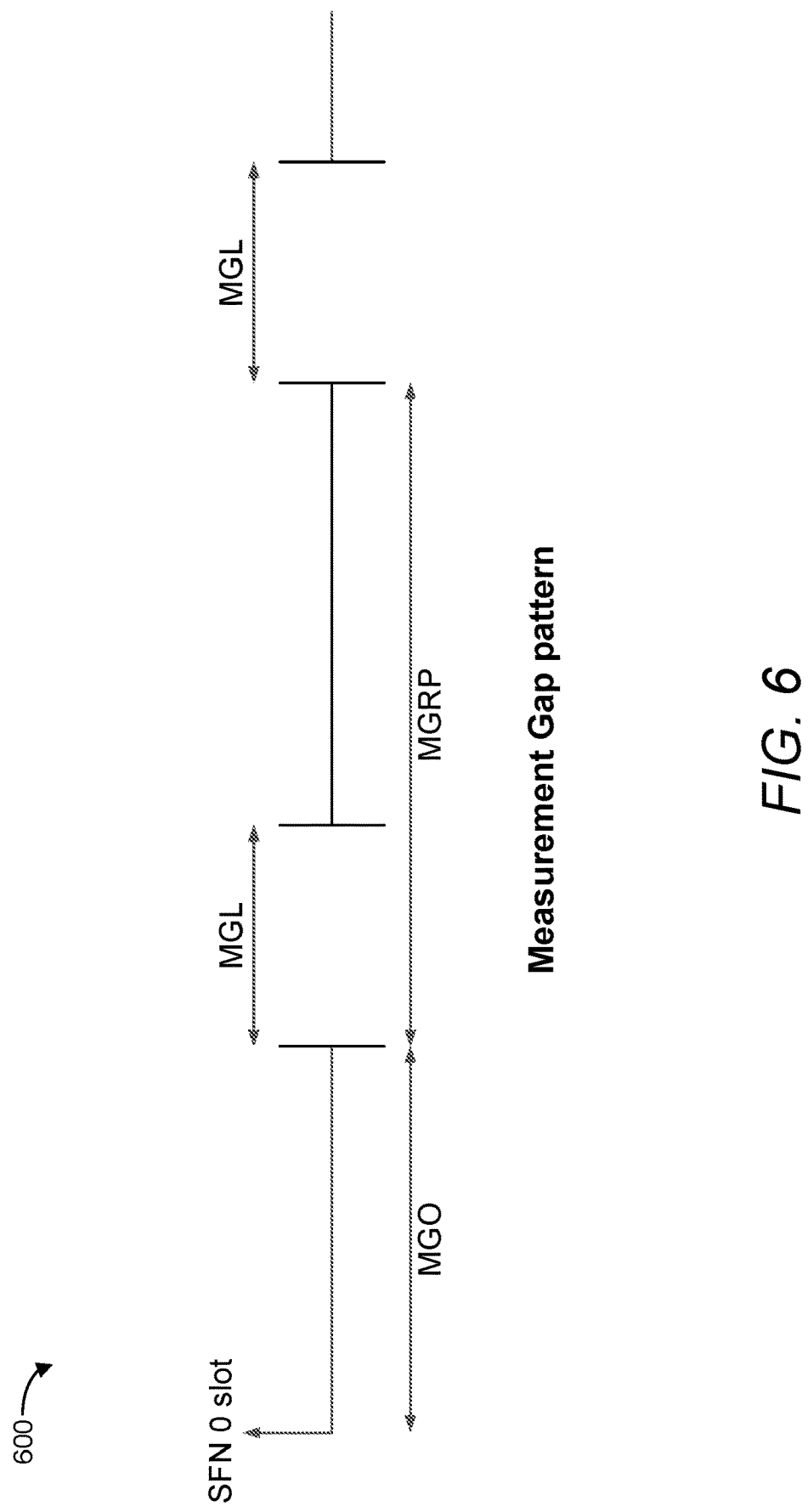
FIG. 6 is a diagram illustrating how the parameters of a measurement gap configuration specify a pattern of measurement gaps, according to aspects of the disclosure.

FIG. 6 is a diagram 600 illustrating how the parameters of a measurement gap configuration specify a pattern of measurement gaps, according to aspects of the disclosure. The measurement gap offset (MGO) is the offset of the start of the gap pattern from the start of a slot or subframe within the measurement gap repetition period (MGRP). There are currently about 160 offset values, but not all of the values are applicable for all periodicities. More specifically, the offset has a value in the range from 0 to one less than the MGRP. Thus, for example, if the MGRP is 20 ms, then the offset can range from 0 to 19.

The measurement gap length (MGL) is the length of the measurement gap in milliseconds. In NR Release 15, the measurement gap length can have a value (in milliseconds) selected from the set of {1.5, 3, 3.5, 4, 5.5, 6}. In NR Release 16, the measurement gap length may have a value (in milliseconds) selected from the set of {10, 18, 20, 34, 40, 50}. The MGRP defines the periodicity (in ms) at which the measurement gap repeats. Although not shown in FIG. 6, a measurement gap configuration may also include a measurement gap timing advance (MGTA) parameter. If configured, the MGTA indicates the amount of time before the occurrence of the slot or subframe in which the measurement gap is configured to begin. Currently, the MGTA can be 0.25 ms for FR2 or 0.5 ms for FR1.

There is one type of measurement gap in NR, meaning the same type of measurement gap is to be used for both radio resource management (RRM) measurements (i.e., the measurements needed for an RRM report) and PRS measurements. In NR, the serving cell configures a UE with periodic measurement gaps during which the UE is expected to perform RRM measurements. In contrast, a UE requests measurement gaps for PRS measurements. It is up to UE implementation to prioritize PRS measurements over RRM measurements, since by default, RRM measurements will have a higher priority, and the UE may not be able to perform both at the same time.

A UE needs measurement gaps for PRS reception so that the UE will be able to allocate all of its processing capability to performing PRS measurements. In legacy technologies, such as LTE, measurement gaps are only needed for inter-frequency or inter-RAT measurements. As such, at the start of a measurement gap, the UE tunes to the target frequency, then performs the measurement, and then tunes back to the source frequency at the end of the gap. No uplink transmission is permitted inside a measurement gap, as the UE is not synchronized to the uplink timing for inter-frequency or inter-RAT cells. This is applicable to both FDD and TDD structures. As in LTE, in NR, no uplink transmissions are permitted inside a measurement gap.

A UE should have information about when DL-PRS are scheduled to be transmitted by the serving base station and any neighboring base stations involved in the positioning session. This information is available from the location server in the PRS configuration, as described above with reference to FIG. 5. As such, the UE can determine when to request measurement gaps.

The measurement gap defined in NR is like the measurement gaps defined in LTE. There is an agreement between the UE and the serving base station that (1) the UE will not perform any uplink transmissions inside the measurement gap and (2) the base station will not transmit any downlink data inside the measurement gap. This is applicable for both TDD and FDD type measurements.

For RTT-type measurements, a UE needs to decode the DL-PRS (the RTT measurement signal) and transmit the SRS-for-positioning (the RTT response signal) to compute the UE Rx-Tx measurement. In order to achieve high accuracy for positioning, the DL-PRS and SRS should be scheduled to be very close to each other in the time domain. If the DL-PRS and SRS are not close in time, the propagation delay and/or channel properties may change for one or both signals, which may result in a poor location estimate. The DL-PRS-to-SRS time difference will be related to the measurement gap length configured by the base station. For NR, the gap length may be on the order of 6 ms to 50 ms.

Figure 7:
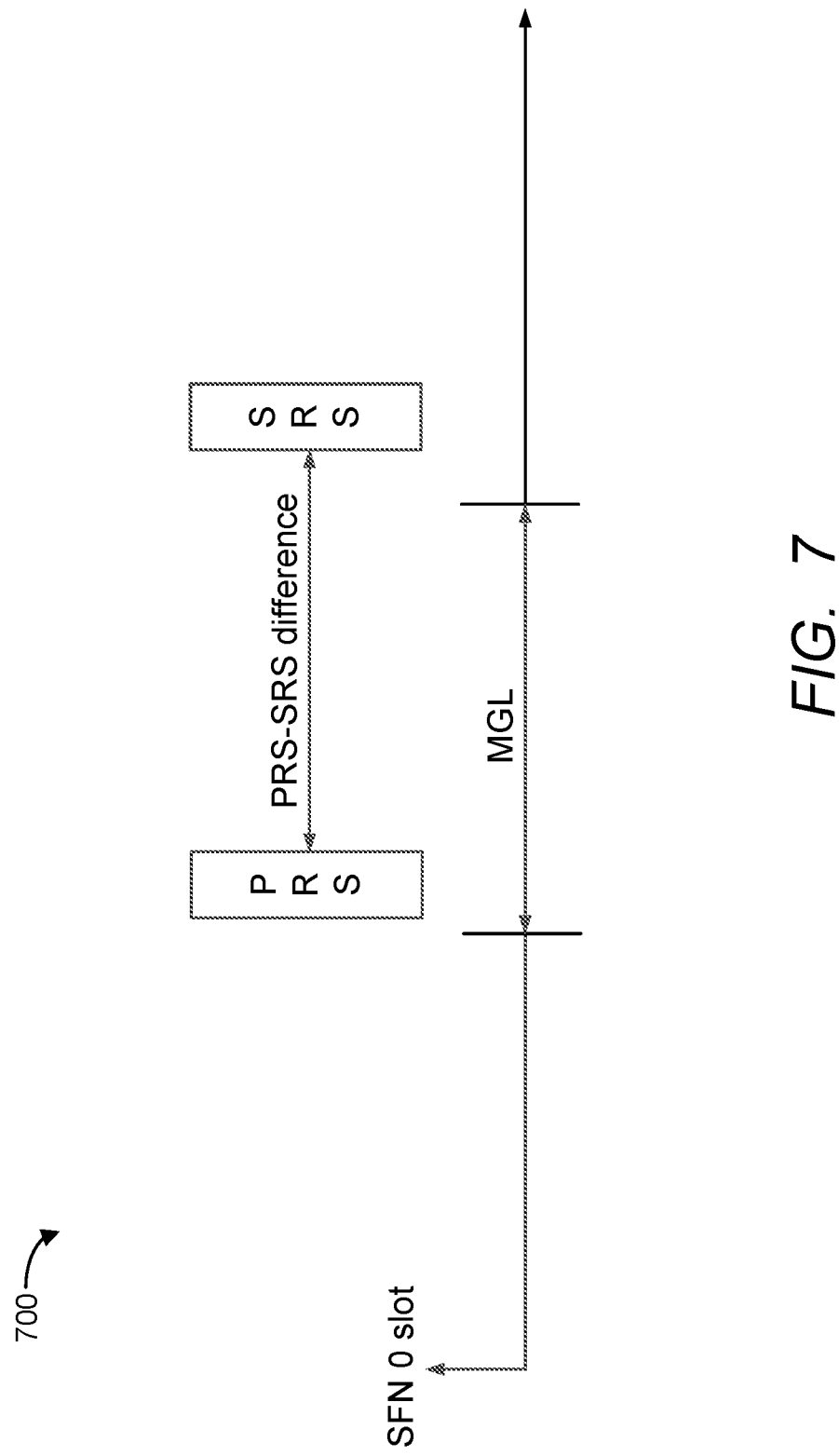
FIG. 7 is a diagram illustrating how the length of the measurement gap can affect the time difference between a downlink PRS (DL-PRS) and a sounding reference signal (SRS)-for-positioning.

FIG. 7 is a diagram 700 illustrating how the length of the measurement gap can affect the time difference between the DL-PRS and the SRS-for-positioning. As shown in FIG. 7, the DL-PRS is scheduled near the start of the measurement gap and the SRS cannot be scheduled until after the measurement gap. As such, there may be from 6 ms to 50 ms between the DL-PRS and the SRS, which may be unacceptable for high-accuracy positioning scenarios.

As another example, FIG. 8 is a diagram 800 of an example sequence of slots in which DL-PRS and measurement gaps are configured. The example slot pattern comprises three downlink slots (labeled "D"), followed by a special slot (labeled "S"), followed by an uplink slot (labeled "U"). Due to the high processing requirements for NR, it is highly likely that a UE would request a measurement gap that is significantly longer than a DL-PRS instance. Thus, in the example of FIG. 8, DL-PRS are transmitted in slots 2, 3, 6, and 7 (which may represent one PRS instance of four slots or two PRS instances of two slots), and a measurement gap spans slots 1 to 12.

If the UE is engaged in an RTT-type positioning procedure, it would be preferable to transmit an SRS-for-positioning in slots 4 or 5 due to the proximity to the DL-PRS transmission. However, in the current implementation of a measurement gap, the first opportunity to transmit the SRS would be in slots 14 and 15 (the first special and uplink slots following the last slot of the measurement gap).

Consider the case where the DL-PRS BWP, SCS, and center frequency are the same for the DL-PRS to be measured during the measurement gap as they are for the serving cell. That means that even though there is a measurement gap for DL-PRR measurements, the UE is not performing any tune in and tune out inside the measurement gap, the UE is on the same frequency the entire time, and the measurement gap is only to ensure that the UE has full PRS processing capabilities.

Accordingly, in this scenario, instead of requesting a measurement gap, the UE may instead request a no-downlink-scheduling gap (or PRS prioritization gap). Like a measurement gap, during a no-downlink-scheduling gap, the serving base station will not transmit any downlink data to the UE, but unlike a measurement gap, the UE can transmit uplink data, such as an SRS-for-positioning. A no-downlink-scheduling gap may have the same parameters as a measurement gap (e.g., length, periodicity, offset, etc.). This signaling ensures that the reported UE capabilities for measurement gap configurations are still applicable.

FIG. 9 is a diagram 900 of an example sequence of slots in which DL-PRS and no-downlink-scheduling gaps are configured. Like the slot pattern illustrated in FIG. 8, the example slot pattern in FIG. 9 comprises three downlink slots (labeled "D"), followed by a special slot (labeled "S"), followed by an uplink slot (labeled "U"). In the example of FIG. 9, DL-PRS are transmitted in slots 3, 4, 6, and 7 (which may represent one PRS instance of four slots or two PRS instances of two slots). In addition, as in FIG. 8, a measurement gap could be configured to span slots 1 to 12, but instead, during this time period, a no-downlink-scheduling gap (labeled "No-DL-Sch GP") is requested and configured. This is represented by the 0's and 1's in the No-DL-Sch GP row.

During the no-downlink-scheduling gap, the base station will not transmit any PDSCH, PDCCH, CSI-RS, or other downlink data in slots 1 to 12. Alternatively, if a downlink transmission occurs during this time, the UE is not required to process the PDSCH, PDCCH, CSI-RS, or other downlink signaling. Instead, the UE will decode only the DL-PRS scheduled in slots 1 to 12 (as illustrated by the 1's in slots 3, 4, 6, and 7 of the No-DL-Sch GP row), or will prioritize DL-PRS processing over any other downlink signaling in this band during this period of time. Unlike a measurement gap, however, the UE may transmit, and the base station receive, SRS during the no-downlink-scheduling gap. Thus, for example, if the UE is engaged in an RTT-type positioning procedure, the UE can transmit an SRS-for-positioning in slot 5 for the DL-PRS received in slots 3 and 4 and in slot 9 or 10 for the DL-PRS received in slots 6 and 7 (the first special and/or uplink slots following the last slot of the DL-PRS transmissions). As will be appreciated, being able to transmit SRS so close to the corresponding DL-PRS can significantly improve positioning performance (e.g., accuracy). In addition, this signaling is different than a measurement gap configuration and will be much easier and faster to configure, as shown below.

A UE can request a no-downlink-scheduling gap using new signaling between the UE and the base station or using existing signaling. To use existing signaling, the UE can use the existing mechanism of requesting a measurement gap. The request may include an additional information element (IE) in the "RequestMeasurementGapConfiguration" message. This additional IE could be an "SRS Allowed" field that has a Boolean value. A value of "true" (e.g., a bit-value of 1) may indicate that SRS are allowed inside the measurement gap. A value of "false" (e.g., a bit-value of 0) may indicate that SRS are not allowed inside the measurement gap (which is the legacy behavior). The base station would then take the action based on the value of this IE.

New signaling to request a no-downlink-scheduling gap may include various parameters defining the no-downlink-scheduling gap. For example, the request may specify a "no downlink scheduling window" or "PRS priority window" of T ms in length. The request may also specify the start of the no-downlink-scheduling gap with a "no downlink scheduling window offset" parameter having a value of T_start. The start time may indicate the offset from the start of a radio frame or SFN, as for a measurement gap in LTE and NR. Alternatively, the offset may be defined with respect to a subframe boundary, a slot boundary, a transmission time of the request for the no-downlink-scheduling gap, or any combination thereof. For example, if the UE sends the request in slot n, the no-downlink-scheduling gap may implicitly be expected in slot n plus K, where K is defined in the applicable standard or configured through higher layers at the UE. The UE may transmit the request (i.e., the values of T and T_start) to the serving base station in a MAC control element (MAC-CE).

There are various differences between a measurement gap, as defined in LTE and NR, and a no-downlink-scheduling gap, as described herein, some of which were described above. In addition, a UE may only process DL-PRS in its active BWP within a no-downlink-scheduling gap—it does not perform any tune-in or tune-out to any other band or bandwidth. Further, the UE is not required to perform RRM measurements (although it may in the active BWP) during a no-downlink-scheduling gap. However, the UE can transmit SRS in the active BWP during this period of time. In contrast, during a measurement gap, as noted above, the UE may have to tune in an out of a different band, it cannot transmit SRS, and it may need to perform RRM measurements. In both cases, the UE can be assumed to have the same processing capabilities.

In some cases, a CSI process may be active before a no-downlink-scheduling gap is configured. In this case, as a first option, the active CSI process(es) may be dropped (e.g., the UE is expected to drop the CSI report). As a second option, the timeline of the CSI process(es) may be extended by the length of the window that was scheduled for the no-downlink-scheduling gap. The reason to avoid CSI processing during a no-downlink-scheduling gap, even after measuring CSI-RS resources, is that CSI processing occupies resources that take away from PRS processing.

Figure 10:
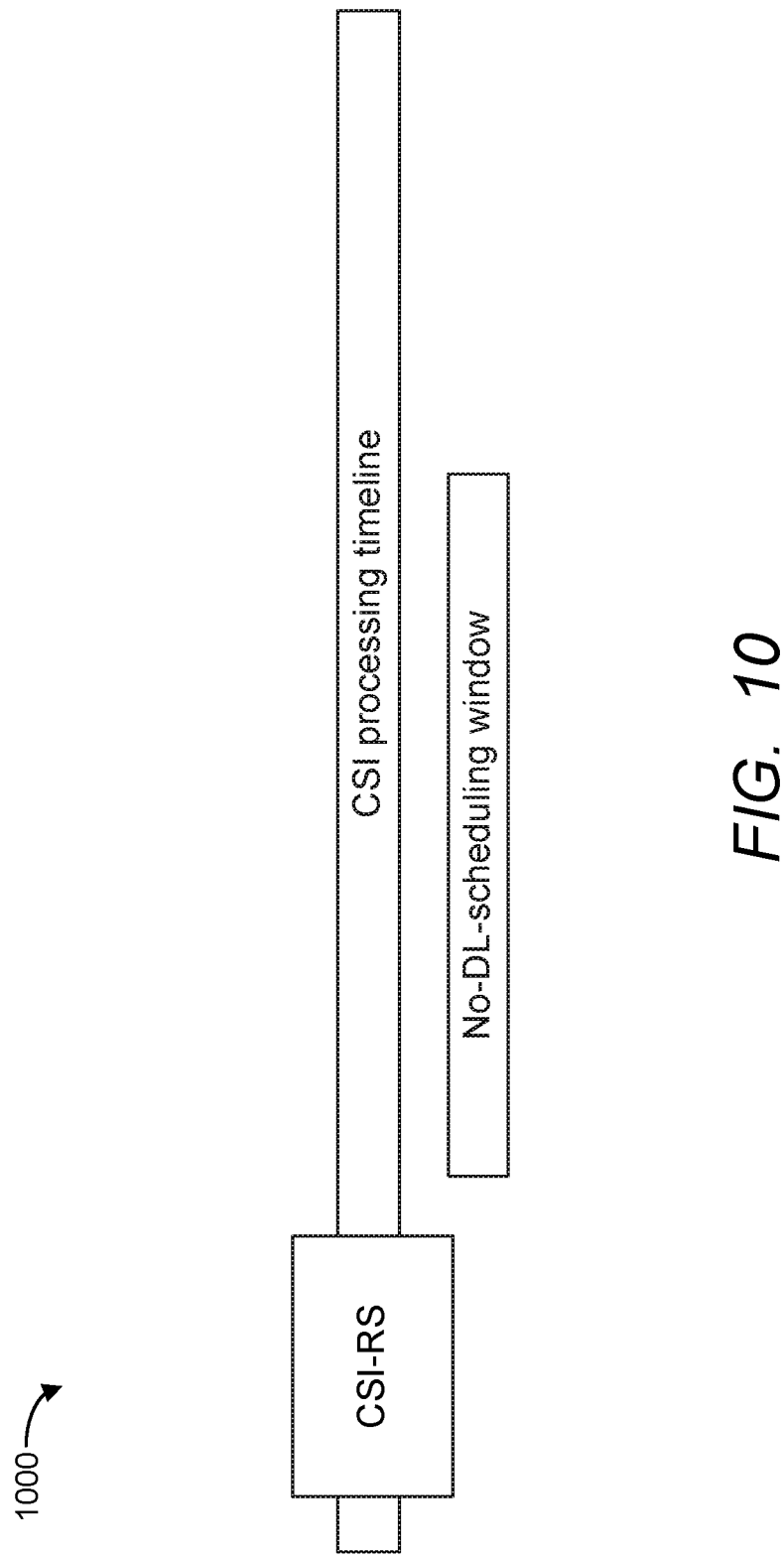
FIG. 10 is a diagram of an example of extending the timeline of a channel state information (CSI) process by the length of a no-downlink-scheduling gap.

FIG. 10 is a diagram 1000 of an example of extending the timeline of a CSI process by the length of a no-downlink-scheduling gap. In the example of FIG. 10, the CSI-RS resources are scheduled and measured before the no-downlink-scheduling gap (labeled "No DL-scheduling window") begins. Because the CSI process is paused during the no-downlink-scheduling gap, the CSI process timeline is extended by the length of the no-downlink-scheduling gap. As such, instead of ending during the no-downlink-scheduling gap, the CSI process timeline extends beyond the no-downlink-scheduling gap, and once the no-downlink-scheduling gap ends, the UE can resume the CSI process.

Similarly, in some cases, a PDSCH process may be active before a no-downlink-scheduling gap is configured. In this case, as a first option, the active PDSCH processing may be dropped (e.g., the UE is expected to report a negative acknowledgment (NACK)). As a second option, the PDSCH processing timeline may be extended by the length of the window that was scheduled for the no-downlink-scheduling gap. Like CSI processing, the reason to avoid PDSCH processing during a no-downlink-scheduling gap, even after receiving the PDSCH data, is that PDSCH processing occupies resources that take away from PRS processing.

Figure 11:
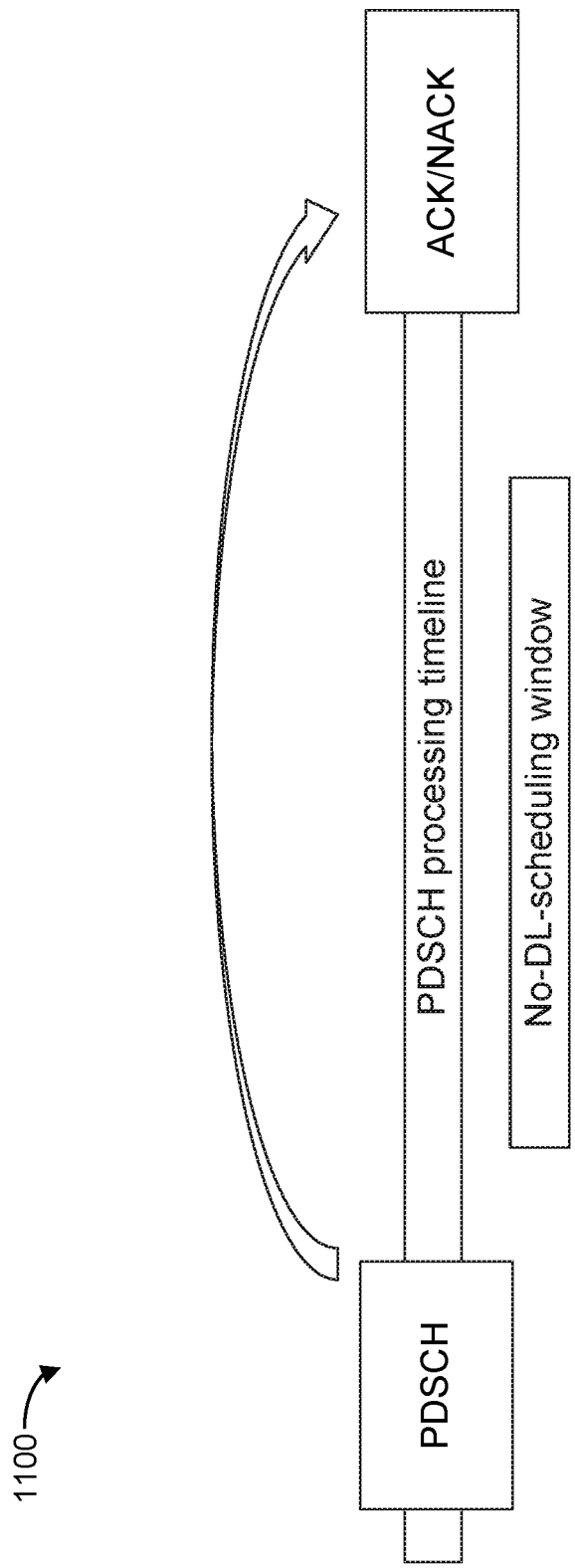
FIG. 11 is a diagram of an example of extending the timeline of a physical downlink shared channel (PDSCH) process by the length of a no-downlink-scheduling gap.

FIG. 11 is a diagram 1100 of an example of extending the timeline of a PDSCH process by the length of a no-downlink-scheduling gap. In the example of FIG. 11, the UE receives the PDSCH before the no-downlink-scheduling gap (labeled "No DL-scheduling window") begins. Because the PDSCH process is paused during the no-downlink-scheduling gap, the PDSCH process timeline is extended by the length of the no-downlink-scheduling gap. As such, instead of ending during the no-downlink-scheduling gap, the PDSCH process timeline extends beyond the no-downlink-scheduling gap, and once the no-downlink-scheduling gap ends, the UE can resume the PDSCH process and send either an acknowledgment (ACK) or NACK as appropriate.

Although the foregoing has described a no-downlink-scheduling gap as having a slot-level granularity (i.e., a length in slots), such a gap may instead have a symbol-level or group of symbols-level granularity (i.e., a length in symbols or groups of symbols). In other words, the UE may request that no other downlink signals should be scheduled within the requested symbols. In addition, a no-downlink-scheduling gap may be associated with at least one or more specific component carriers, or band indexes, or BWP indexes, or it may be applicable to all component carriers, bands, or active BWPs across all the active component carriers of the UE.

Figure 12:
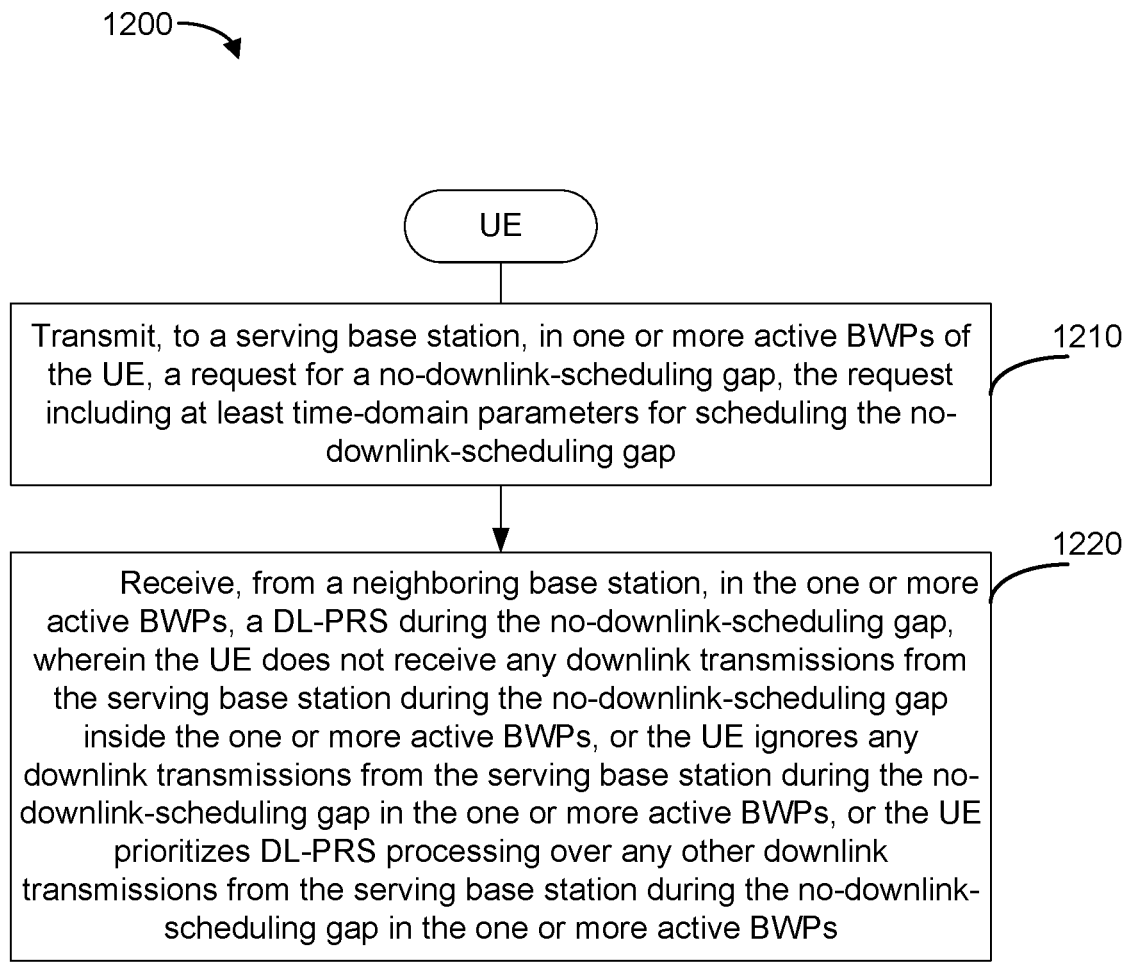
FIGS. 12 and 13 illustrate example methods of wireless communication, according to aspects of the disclosure.

FIG. 12 illustrates an example method 1200 of wireless communication, according to aspects of the disclosure. In an aspect, method 1200 may be performed by a UE (e.g., any of the UEs described herein).

At 1210, the UE transmits, to a serving base station (e.g., any of the base stations described herein), in one or more active BWPs (e.g., up to four) of the UE, a request for a no-downlink-scheduling gap, the request including at least time-domain parameters (e.g., a length and an offset) related to scheduling the no-downlink-scheduling gap. In an aspect, operation 1210 may be performed by the one or more WWAN transceivers 310, the one or more processors 332, memory 340, and/or positioning component 342, any or all of which may be considered means for performing this operation.

At 1220, the UE receives, from a neighboring base station (e.g., any other of the base stations described herein), in the one or more active BWPs, a DL-PRS during the no-downlink-scheduling gap. In an aspect, the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs. In an aspect, operation 1220 may be performed by the one or more WWAN transceivers 310, the one or more processors 332, memory 340, and/or positioning component 342, any or all of which may be considered means for performing this operation.

Figure 13:
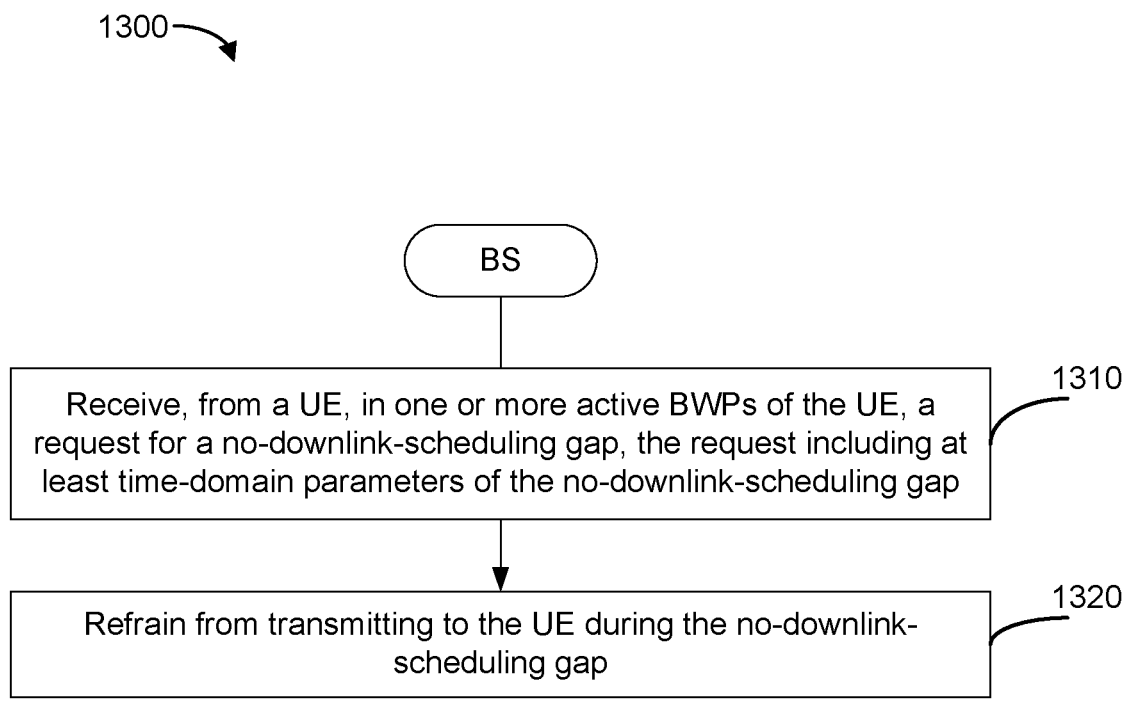

FIG. 13 illustrates an example method 1300 of wireless communication, according to aspects of the disclosure. In an aspect, method 1300 may be performed by a base station (e.g., any of the base stations described herein).

At 1310, the base station receives, from a UE (e.g., any of the UEs described herein), in an active BWP of the UE, a request for a no-downlink-scheduling gap, the request including at least time-domain parameters (e.g., a length and an offset) of the no-downlink-scheduling gap. In an aspect, operation 1310 may be performed by the one or more WWAN transceivers 350, the one or more processors 384, memory 386, and/or positioning component 388, any or all of which may be considered means for performing this operation.

At 1320, the UE refrains from transmitting to the UE during the no-downlink-scheduling gap. In an aspect, operation 1320 may be performed by the one or more WWAN transceivers 350, the one or more processors 384, memory 386, and/or positioning component 388, any or all of which may be considered means for performing this operation.

As will be appreciated, a technical advantage of the methods 1200 and 1300 is that a UE can prioritize positioning operations during the no-downlink-scheduling gap without the drawbacks of requesting a measurement gap.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting, to a serving base station, in one or more active bandwidth part (BWPs) of the UE, a request for a no-downlink-scheduling gap, the request including at least a length and an offset of the no-downlink-scheduling gap; and receiving, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

Clause 2. The method of clause 1, further comprising: transmitting, in the one or more active BWPs, an uplink positioning reference signal (UL-PRS) during the no-downlink-scheduling gap.

Clause 3. The method of clause 2, wherein the UL-PRS comprises a sounding reference signal (SRS) for positioning, an SRS configured at least for communication purposes, a demodulation reference signal (DMRS), a physical uplink shared channel (PUSCH), or a physical uplink control channel (PUCCH).

Clause 4. The method of any of clauses 1 to 3, wherein: the request comprises a request for a measurement gap, the length and the offset of the no-downlink-scheduling gap comprises a length and an offset of the measurement gap, and the request includes a flag indicating that the UE is permitted to transmit UL-PRS during the measurement gap.

Clause 5. The method of clause 4, wherein: a true value of the flag indicates that the UE is permitted to transmit UL-PRS during the measurement gap, and a false value of the flag indicates that the UE is not permitted to transmit UL-PRS during the measurement gap.

Clause 6. The method of any of clauses 1 to 5, wherein the request is included in a medium access control control element (MAC-CE).

Clause 7. The method of any of clauses 1 to 6, wherein the UE remains in the one or more active BWPs for an entirety of the no-downlink-scheduling gap.

Clause 8. The method of any of clauses 1 to 7, wherein the UE is not expected to perform radio resource management (RRM) measurements in the one or more active BWPs during the no-downlink-scheduling gap.

Clause 9. The method of any of clauses 1 to 7, wherein the UE performs RRM measurements in the one or more active BWPs during the no-downlink-scheduling gap based on capabilities of the UE.

Clause 10. The method of any of clauses 1 to 9, wherein the length and the offset of the no-downlink-scheduling gap are each specified as a number of symbols, groups of symbols, or slots.

Clause 11. The method of any of clauses 1 to 10, wherein the offset of the no-downlink-scheduling gap is defined with respect to a frame boundary, a subframe boundary, a slot boundary, a transmission time of the request, or any combination thereof.

Clause 12. The method of any of clauses 1 to 11, wherein the no-downlink-scheduling gap is associated with at least one or more component carriers, frequency band indexes, or BWP indexes.

Clause 13. The method of any of clauses 1 to 12, wherein the no-downlink-scheduling gap is associated with all component carriers, all frequency bands, or all BWPs across all active component carriers of the UE.

Clause 14. The method of any of clauses 1 to 13, wherein the UE requests the no-downlink-scheduling gap based on a DL-PRS configuration for the neighboring base station received from a location server.

Clause 15. The method of any of clauses 1 to 14, further comprising: measuring channel state information reference signal (CSI-RS) resources before the no-downlink-scheduling gap; ceasing any CSI-related processing of the measured CSI-RS resources during the no-downlink-scheduling gap; and dropping a CSI report associated with the ceased CSI-related processing of the CSI-RS resources.

Clause 16. The method of any of clauses 1 to 14, further comprising: measuring CSI-RS resources before the no-downlink-scheduling gap; extending a length of a CSI processing timeline by a length of the no-downlink-scheduling gap; and transmitting, to the serving base station, a CSI report associated with the CSI-RS resources at least based on the extended CSI processing timeline.

Clause 17. The method of any of clauses 1 to 16, further comprising: receiving a physical downlink shared channel (PDSCH) before the no-downlink-scheduling gap; ceasing the PDSCH processing during the no-downlink-scheduling gap; and transmitting, to the serving base station, a negative acknowledgment (NACK) for the PDSCH.

Clause 18. The method of any of clauses 1 to 16, further comprising: receiving a PDSCH before the no-downlink-scheduling gap; extending a length of a PDSCH processing timeline by a length of the no-downlink-scheduling gap; and transmitting, to the serving base station, an acknowledgment associated with the PDSCH at least based on the extended PDSCH processing timeline.

Clause 19. A method of wireless communication performed by a base station, comprising: receiving, from a user equipment (UE), in one or more active bandwidth parts (BWPs) of the UE, a request for a no-downlink-scheduling gap, the request including at least a length and an offset of the no-downlink-scheduling gap; and refraining from transmitting to the UE during the no-downlink-scheduling gap.

Clause 20. The method of clause 19, wherein: the request comprises a request for a measurement gap, the length and the offset of the no-downlink-scheduling gap comprises a length and an offset of the measurement gap, and the request includes a flag indicating that the UE is permitted to transmit UL-PRS during the measurement gap.

Clause 21. The method of clause 20, wherein: a true value of the flag indicates that the UE is permitted to transmit UL-PRS during the measurement gap, and a false value of the flag indicates that the UE is not permitted to transmit UL-PRS during the measurement gap.

Clause 22. The method of any of clauses 19 to 21, wherein the request is included in a medium access control control element (MAC-CE).

Clause 23. The method of any of clauses 19 to 22, wherein the length and the offset of the no-downlink-scheduling gap are each specified as a number of symbols, groups of symbols, or slots.

Clause 24. The method of any of clauses 19 to 23, wherein the offset of the no-downlink-scheduling gap is defined with respect to a frame boundary, a subframe boundary, a slot boundary, a transmission time of the request, or any combination thereof.

Clause 25. The method of any of clauses 19 to 24, wherein the no-downlink-scheduling gap is associated with at least one or more component carriers, frequency band indexes, or BWP indexes.

Clause 26. The method of any of clauses 19 to 25, wherein the no-downlink-scheduling gap is associated with all component carriers, all frequency bands, or all BWPs across all active component carriers of the UE.

Clause 27. The method of any of clauses 19 to 26, further comprising: transmitting, to the UE, before the no-downlink-scheduling gap, channel state information reference signal (CSI-RS) resources for a CSI report; and receiving the CSI report from the UE after the no-downlink-scheduling gap, a CSI processing timeline within which the UE is permitted to transmit the CSI report having been extended by a length of the no-downlink-scheduling gap.

Clause 28. The method of any of clauses 19 to 27, further comprising: transmitting, to the UE, before the no-downlink-scheduling gap, a physical downlink shared channel (PDSCH); and receiving, from the UE, an acknowledgment for the PDSCH after the no-downlink-scheduling gap, a PDSCH processing timeline in which the UE is permitted to transmit the acknowledgment having been extended by a length of the no-downlink-scheduling gap.

Clause 29. An apparatus comprising a memory, at least one transceiver, and at least one processor communicatively coupled to the memory and the at least one transceiver, the memory, the at least one transceiver, and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Additional implementation examples are described in the following numbered clauses:

Clause 1. A method of wireless communication performed by a user equipment (UE), comprising: transmitting, to a serving base station, in one or more active bandwidth parts (BWPs) of the UE, a request for a no-downlink-scheduling gap, the request including at least time-domain parameters related to scheduling the no-downlink-scheduling gap; and receiving, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

Clause 2. The method of clause 1, further comprising: transmitting, in the one or more active BWPs, an uplink positioning reference signal (UL-PRS) during the no-downlink-scheduling gap.

Clause 3. The method of clause 2, wherein the UL-PRS comprises a sounding reference signal (SRS) for positioning, an SRS configured at least for communication purposes, a demodulation reference signal (DMRS), a physical uplink shared channel (PUSCH), or a physical uplink control channel (PUCCH).

Clause 4. The method of any of clauses 1 to 3, wherein: the request comprises a request for a measurement gap, the time-domain parameters comprise a length and an offset of the no-downlink-scheduling gap, the length and the offset of the no-downlink-scheduling gap comprise a length and an offset of the measurement gap, and the request includes a flag indicating that the UE is permitted to transmit UL-PRS during the measurement gap.

Clause 5. The method of any of clauses 1 to 4, wherein the request is included in a medium access control control element (MAC-CE).

Clause 6. The method of any of clauses 1 to 5, further comprising: remaining in the one or more active BWPs for an entirety of the no-downlink-scheduling gap.

Clause 7. The method of any of clauses 1 to 6, wherein the UE is not expected to perform radio resource management (RRM) measurements in the one or more active BWPs during the no-downlink-scheduling gap.

Clause 8. The method of any of clauses 1 to 6, further comprising: performing RRM measurements in the one or more active BWPs during the no-downlink-scheduling gap based on capabilities of the UE.

Clause 9. The method of any of clauses 1 to 8, wherein the time-domain parameters comprise a length and an offset of the no-downlink-scheduling gap.

Clause 10. The method of clause 9, wherein the length and the offset of the no-downlink-scheduling gap are each specified as a number of symbols, groups of symbols, or slots.

Clause 11. The method of any of clauses 9 to 10, wherein the offset of the no-downlink-scheduling gap is defined with respect to a frame boundary, a subframe boundary, a slot boundary, a transmission time of the request, or any combination thereof.

Clause 12. The method of any of clauses 1 to 11, wherein the no-downlink-scheduling gap is associated with at least one or more component carriers, frequency band indexes, or BWP indexes.

Clause 13. The method of any of clauses 1 to 12, wherein the no-downlink-scheduling gap is associated with all component carriers, all frequency bands within at least Long-Term Evolution (LTE) or New Radio (NR), or all BWPs across all active component carriers of the UE.

Clause 14. The method of any of clauses 1 to 13, further comprising: requesting the no-downlink-scheduling gap based on a DL-PRS configuration for the neighboring base station received from a location server.

Clause 15. The method of any of clauses 1 to 14, further comprising: measuring channel state information reference signal (CSI-RS) resources before the no-downlink-scheduling gap; ceasing any CSI-related processing of the CSI-RS resources during the no-downlink-scheduling gap; and dropping a CSI report associated with the ceased CSI-related processing of the CSI-RS resources.

Clause 16. The method of any of clauses 1 to 14, further comprising: measuring CSI-RS resources before the no-downlink-scheduling gap; and transmitting, to the serving base station, a CSI report associated with the CSI-RS resources at least based on an extended CSI processing timeline, wherein the extended CSI processing timeline is a length of a CSI processing timeline extended by a length of the no-downlink-scheduling gap.

Clause 17. The method of any of clauses 1 to 16, further comprising: receiving a physical downlink shared channel (PDSCH) before the no-downlink-scheduling gap; ceasing the PDSCH processing during the no-downlink-scheduling gap; and transmitting, to the serving base station, a negative acknowledgment (NACK) for the PDSCH.

Clause 18. The method of any of clauses 1 to 16, further comprising: receiving a PDSCH before the no-downlink-scheduling gap; and transmitting, to the serving base station, an acknowledgment associated with the PDSCH at least based on an extended PDSCH processing timeline, wherein the extended PDSCH processing timeline is a length of a PDSCH processing timeline extended by a length of the no-downlink-scheduling gap.

Clause 19. A method of wireless communication performed by a base station, comprising: receiving, from a user equipment (UE), in one or more active bandwidth parts (BWPs) of the UE, a request for a no-downlink-scheduling gap, the request including at least time-domain parameters of the no-downlink-scheduling gap; and refraining from transmitting to the UE during the no-downlink-scheduling gap.

Clause 20. The method of clause 19, wherein: the request comprises a request for a measurement gap, the time-domain parameters comprise a length and an offset of the no-downlink-scheduling gap, the length and the offset of the no-downlink-scheduling gap comprises a length and an offset of the measurement gap, and the request includes a flag indicating that the UE is permitted to transmit UL-PRS during the measurement gap.

Clause 21. The method of any of clauses 19 to 20, wherein the request is included in a medium access control control element (MAC-CE).

Clause 22. The method of any of clauses 19 to 21, wherein the time-domain parameters comprise a length and an offset of the no-downlink-scheduling gap.

Clause 23. The method of clause 22, wherein the length and the offset of the no-downlink-scheduling gap are each specified as a number of symbols, groups of symbols, or slots.

Clause 24. The method of any of clauses 22 to 23, wherein the offset of the no-downlink-scheduling gap is defined with respect to a frame boundary, a subframe boundary, a slot boundary, a transmission time of the request, or any combination thereof.

Clause 25. The method of any of clauses 19 to 24, wherein the no-downlink-scheduling gap is associated with at least one or more component carriers, frequency band indexes, or BWP indexes.

Clause 26. The method of any of clauses 19 to 25, wherein the no-downlink-scheduling gap is associated with all component carriers, all frequency bands, or all BWPs across all active component carriers of the UE.

Clause 27. The method of any of clauses 19 to 26, further comprising: transmitting, to the UE, before the no-downlink-scheduling gap, channel state information reference signal (CSI-RS) resources for a CSI report; and receiving the CSI report from the UE after the no-downlink-scheduling gap, a CSI processing timeline within which the UE is permitted to transmit the CSI report having been extended by a length of the no-downlink-scheduling gap.

Clause 28. The method of any of clauses 19 to 27, further comprising: transmitting, to the UE, before the no-downlink-scheduling gap, a physical downlink shared channel (PDSCH); and receiving, from the UE, an acknowledgment for the PDSCH after the no-downlink-scheduling gap, a PDSCH processing timeline in which the UE is permitted to transmit the acknowledgment having been extended by a length of the no-downlink-scheduling gap.

Clause 29. A user equipment (UE), comprising: a memory; at least one transceiver; and at least one processor communicatively coupled to the memory and the at least one transceiver, the at least one processor configured to: transmit, via the at least one transceiver, to a serving base station, in one or more active bandwidth parts (BWPs) of the UE, a request for a no-downlink-scheduling gap, the request including at least time-domain parameters related to scheduling the no-downlink-scheduling gap; and receive, via the at least one transceiver, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

Clause 30. The UE of clause 29, wherein the at least one processor is further configured to: transmit, via the at least one transceiver, in the one or more active BWPs, an uplink positioning reference signal (UL-PRS) during the no-downlink-scheduling gap.

Clause 31. The UE of clause 30, wherein the UL-PRS comprises a sounding reference signal (SRS) for positioning, an SRS configured at least for communication purposes, a demodulation reference signal (DMRS), a physical uplink shared channel (PUSCH), or a physical uplink control channel (PUCCH).

Clause 32. The UE of any of clauses 29 to 31, wherein: the request comprises a request for a measurement gap, the time-domain parameters comprise a length and an offset of the no-downlink-scheduling gap, the length and the offset of the no-downlink-scheduling gap comprise a length and an offset of the measurement gap, and the request includes a flag indicating that the UE is permitted to transmit UL-PRS during the measurement gap.

Clause 33. The UE of any of clauses 29 to 32, wherein the request is included in a medium access control control element (MAC-CE).

Clause 34. The UE of any of clauses 29 to 33, wherein the at least one processor is further configured to: remain in the one or more active BWPs for an entirety of the no-downlink-scheduling gap.

Clause 35. The UE of any of clauses 29 to 34, wherein the UE is not expected to perform radio resource management (RRM) measurements in the one or more active BWPs during the no-downlink-scheduling gap.

Clause 36. The UE of any of clauses 29 to 34, wherein the at least one processor is further configured to: perform RRM measurements in the one or more active BWPs during the no-downlink-scheduling gap based on capabilities of the UE.

Clause 37. The UE of any of clauses 29 to 36, wherein the time-domain parameters comprise a length and an offset of the no-downlink-scheduling gap.

Clause 38. The UE of clause 37, wherein the length and the offset of the no-downlink-scheduling gap are each specified as a number of symbols, groups of symbols, or slots.

Clause 39. The UE of any of clauses 37 to 38, wherein the offset of the no-downlink-scheduling gap is defined with respect to a frame boundary, a subframe boundary, a slot boundary, a transmission time of the request, or any combination thereof.

Clause 40. The UE of any of clauses 29 to 39, wherein the no-downlink-scheduling gap is associated with at least one or more component carriers, frequency band indexes, or BWP indexes.

Clause 41. The UE of any of clauses 29 to 40, wherein the no-downlink-scheduling gap is associated with all component carriers, all frequency bands within at least Long-Term Evolution (LTE) or New Radio (NR), or all BWPs across all active component carriers of the UE.

Clause 42. The UE of any of clauses 29 to 41, wherein the at least one processor is further configured to: request the no-downlink-scheduling gap based on a DL-PRS configuration for the neighboring base station received from a location server.

Clause 43. The UE of any of clauses 29 to 42, wherein the at least one processor is further configured to: measure channel state information reference signal (CSI-RS) resources before the no-downlink-scheduling gap; cease any CSI-related processing of the CSI-RS resources during the no-downlink-scheduling gap; and drop a CSI report associated with the ceased CSI-related processing of the CSI-RS resources.

Clause 44. The UE of any of clauses 29 to 42, wherein the at least one processor is further configured to: measure CSI-RS resources before the no-downlink-scheduling gap; and transmit, via the at least one transceiver, to the serving base station, a CSI report associated with the CSI-RS resources at least based on an extended CSI processing timeline, wherein the extended CSI processing timeline is a length of a CSI processing timeline extended by a length of the no-downlink-scheduling gap.

Clause 45. The UE of any of clauses 29 to 44, wherein the at least one processor is further configured to: receive, via the at least one transceiver, a physical downlink shared channel (PDSCH) before the no-downlink-scheduling gap; cease the PDSCH processing during the no-downlink-scheduling gap; and transmit, via the at least one transceiver, to the serving base station, a negative acknowledgment (NACK) for the PDSCH.

Clause 46. The UE of any of clauses 29 to 44, wherein the at least one processor is further configured to: receive, via the at least one transceiver, a PDSCH before the no-downlink-scheduling gap; and transmit, via the at least one transceiver, to the serving base station, an acknowledgment associated with the PDSCH at least based on an extended PDSCH processing timeline, wherein the extended PDSCH processing timeline is a length of a PDSCH processing timeline extended by a length of the no-downlink-scheduling gap.

Clause 47. A base station, comprising: a memory; at least one transceiver; and at least one processor communicatively coupled to the memory and the at least one transceiver, the at least one processor configured to: receive, via the at least one transceiver, from a user equipment (UE), in one or more active bandwidth parts (BWPs) of the UE, a request for a no-downlink-scheduling gap, the request including at least time-domain parameters of the no-downlink-scheduling gap; and refrain from transmitting to the UE during the no-downlink-scheduling gap.

Clause 48. The base station of clause 47, wherein: the request comprises a request for a measurement gap, the time-domain parameters comprise a length and an offset of the no-downlink-scheduling gap, the length and the offset of the no-downlink-scheduling gap comprises a length and an offset of the measurement gap, and the request includes a flag indicating that the UE is permitted to transmit UL-PRS during the measurement gap.

Clause 49. The base station of any of clauses 47 to 48, wherein the request is included in a medium access control control element (MAC-CE).

Clause 50. The base station of any of clauses 47 to 49, wherein the time-domain parameters comprise a length and an offset of the no-downlink-scheduling gap.

Clause 51. The base station of clause 50, wherein the length and the offset of the no-downlink-scheduling gap are each specified as a number of symbols, groups of symbols, or slots.

Clause 52. The base station of any of clauses 50 to 51, wherein the offset of the no-downlink-scheduling gap is defined with respect to a frame boundary, a subframe boundary, a slot boundary, a transmission time of the request, or any combination thereof.

Clause 53. The base station of any of clauses 47 to 52, wherein the no-downlink-scheduling gap is associated with at least one or more component carriers, frequency band indexes, or BWP indexes.

Clause 54. The base station of any of clauses 47 to 53, wherein the no-downlink-scheduling gap is associated with all component carriers, all frequency bands, or all BWPs across all active component carriers of the UE.

Clause 55. The base station of any of clauses 47 to 54, wherein the at least one processor is further configured to: transmit, via the at least one transceiver, to the UE, before the no-downlink-scheduling gap, channel state information reference signal (CSI-RS) resources for a CSI report; and receive, via the at least one transceiver, the CSI report from the UE after the no-downlink-scheduling gap, a CSI processing timeline within which the UE is permitted to transmit the CSI report having been extended by a length of the no-downlink-scheduling gap.

Clause 56. The base station of any of clauses 47 to 55, wherein the at least one processor is further configured to: transmit, via the at least one transceiver, to the UE, before the no-downlink-scheduling gap, a physical downlink shared channel (PDSCH); and receive, via the at least one transceiver, from the UE, an acknowledgment for the PDSCH after the no-downlink-scheduling gap, a PDSCH processing timeline in which the UE is permitted to transmit the acknowledgment having been extended by a length of the no-downlink-scheduling gap.

Clause 57. A user equipment (UE), comprising: means for transmitting, to a serving base station, in one or more active bandwidth parts (BWPs) of the UE, a request for a no-downlink-scheduling gap, the request including at least time-domain parameters related to scheduling the no-downlink-scheduling gap; and means for receiving, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

Clause 58. The UE of clause 57, further comprising: means for transmitting, in the one or more active BWPs, an uplink positioning reference signal (UL-PRS) during the no-downlink-scheduling gap.

Clause 59. The UE of clause 58, wherein the UL-PRS comprises a sounding reference signal (SRS) for positioning, an SRS configured at least for communication purposes, a demodulation reference signal (DMRS), a physical uplink shared channel (PUSCH), or a physical uplink control channel (PUCCH).

Clause 60. The UE of any of clauses 57 to 59, wherein: the request comprises a request for a measurement gap, the time-domain parameters comprise a length and an offset of the no-downlink-scheduling gap, the length and the offset of the no-downlink-scheduling gap comprise a length and an offset of the measurement gap, and the request includes a flag indicating that the UE is permitted to transmit UL-PRS during the measurement gap.

Clause 61. The UE of any of clauses 57 to 60, wherein the request is included in a medium access control control element (MAC-CE).

Clause 62. The UE of any of clauses 57 to 61, further comprising: means for remaining in the one or more active BWPs for an entirety of the no-downlink-scheduling gap.

Clause 63. The UE of any of clauses 57 to 62, wherein the UE is not expected to perform radio resource management (RRM) measurements in the one or more active BWPs during the no-downlink-scheduling gap.

Clause 64. The UE of any of clauses 57 to 62, further comprising: means for performing RRM measurements in the one or more active BWPs during the no-downlink-scheduling gap based on capabilities of the UE.

Clause 65. The UE of any of clauses 57 to 64, wherein the time-domain parameters comprise a length and an offset of the no-downlink-scheduling gap.

Clause 66. The UE of clause 65, wherein the length and the offset of the no-downlink-scheduling gap are each specified as a number of symbols, groups of symbols, or slots.

Clause 67. The UE of any of clauses 65 to 66, wherein the offset of the no-downlink-scheduling gap is defined with respect to a frame boundary, a subframe boundary, a slot boundary, a transmission time of the request, or any combination thereof.

Clause 68. The UE of any of clauses 57 to 67, wherein the no-downlink-scheduling gap is associated with at least one or more component carriers, frequency band indexes, or BWP indexes.

Clause 69. The UE of any of clauses 57 to 68, wherein the no-downlink-scheduling gap is associated with all component carriers, all frequency bands within at least Long-Term Evolution (LTE) or New Radio (NR), or all BWPs across all active component carriers of the UE.

Clause 70. The UE of any of clauses 57 to 69, further comprising: means for requesting the no-downlink-scheduling gap based on a DL-PRS configuration for the neighboring base station received from a location server.

Clause 71. The UE of any of clauses 57 to 70, further comprising: means for measuring channel state information reference signal (CSI-RS) resources before the no-downlink-scheduling gap; means for ceasing any CSI-related processing of the CSI-RS resources during the no-downlink-scheduling gap; and means for dropping a CSI report associated with the ceased CSI-related processing of the CSI-RS resources.

Clause 72. The UE of any of clauses 57 to 70, further comprising: means for measuring CSI-RS resources before the no-downlink-scheduling gap; and means for transmitting, to the serving base station, a CSI report associated with the CSI-RS resources at least based on an extended CSI processing timeline, wherein the extended CSI processing timeline is a length of a CSI processing timeline extended by a length of the no-downlink-scheduling gap.

Clause 73. The UE of any of clauses 57 to 72, further comprising: means for receiving a physical downlink shared channel (PDSCH) before the no-downlink-scheduling gap; means for ceasing the PDSCH processing during the no-downlink-scheduling gap; and means for transmitting, to the serving base station, a negative acknowledgment (NACK) for the PDSCH.

Clause 74. The UE of any of clauses 57 to 72, further comprising: means for receiving a PDSCH before the no-downlink-scheduling gap; and means for transmitting, to the serving base station, an acknowledgment associated with the PDSCH at least based on an extended PDSCH processing timeline, wherein the extended PDSCH processing timeline is a length of a PDSCH processing timeline extended by a length of the no-downlink-scheduling gap.

Clause 75. A base station, comprising: means for receiving, from a user equipment (UE), in one or more active bandwidth parts (BWPs) of the UE, a request for a no-downlink-scheduling gap, the request including at least time-domain parameters of the no-downlink-scheduling gap; and means for refraining from transmitting to the UE during the no-downlink-scheduling gap.

Clause 76. The base station of clause 75, wherein: the request comprises a request for a measurement gap, the time-domain parameters comprise a length and an offset of the no-downlink-scheduling gap, the length and the offset of the no-downlink-scheduling gap comprises a length and an offset of the measurement gap, and the request includes a flag indicating that the UE is permitted to transmit UL-PRS during the measurement gap.

Clause 77. The base station of any of clauses 75 to 76, wherein the request is included in a medium access control control element (MAC-CE).

Clause 78. The base station of any of clauses 75 to 77, wherein the time-domain parameters comprise a length and an offset of the no-downlink-scheduling gap.

Clause 79. The base station of clause 78, wherein the length and the offset of the no-downlink-scheduling gap are each specified as a number of symbols, groups of symbols, or slots.

Clause 80. The base station of any of clauses 78 to 79, wherein the offset of the no-downlink-scheduling gap is defined with respect to a frame boundary, a subframe boundary, a slot boundary, a transmission time of the request, or any combination thereof.

Clause 81. The base station of any of clauses 75 to 80, wherein the no-downlink-scheduling gap is associated with at least one or more component carriers, frequency band indexes, or BWP indexes.

Clause 82. The base station of any of clauses 75 to 81, wherein the no-downlink-scheduling gap is associated with all component carriers, all frequency bands, or all BWPs across all active component carriers of the UE.

Clause 83. The base station of any of clauses 75 to 82, further comprising: means for transmitting, to the UE, before the no-downlink-scheduling gap, channel state information reference signal (CSI-RS) resources for a CSI report; and means for receiving the CSI report from the UE after the no-downlink-scheduling gap, a CSI processing timeline within which the UE is permitted to transmit the CSI report having been extended by a length of the no-downlink-scheduling gap.

Clause 84. The base station of any of clauses 75 to 83, further comprising: means for transmitting, to the UE, before the no-downlink-scheduling gap, a physical downlink shared channel (PDSCH); and means for receiving, from the UE, an acknowledgment for the PDSCH after the no-downlink-scheduling gap, a PDSCH processing timeline in which the UE is permitted to transmit the acknowledgment having been extended by a length of the no-downlink-scheduling gap.

Clause 85. A non-transitory computer-readable medium storing computer-executable instructions that, when executed by a user equipment (UE), cause the UE to: transmit, to a serving base station, in one or more active bandwidth parts (BWPs) of the UE, a request for a no-downlink-scheduling gap, the request including at least time-domain parameters related to scheduling the no-downlink-scheduling gap; and receive, from a neighboring base station, in the one or more active BWPs, a downlink positioning reference signal (DL-PRS) during the no-downlink-scheduling gap, wherein: the UE does not receive any downlink transmissions from the serving base station during the no-downlink-scheduling gap inside the one or more active BWPs, or the UE ignores any downlink transmissions from the serving base station during the no-downlink-scheduling gap in the one or more active BWPs, or the UE prioritizes DL-PRS processing over any other downlink transmissions from the serving base station during the no-downlink-scheduling gap in the one or more active BWPs.

Clause 86. The non-transitory computer-readable medium of clause 85, wherein the one or more instructions further cause the UE to: transmit, in the one or more active BWPs, an uplink positioning reference signal (UL-PRS) during the no-downlink-scheduling gap.

Clause 87. The non-transitory computer-readable medium of clause 86, wherein the UL-PRS comprises a sounding reference signal (SRS) for positioning, an SRS configured at least for communication purposes, a demodulation reference signal (DMRS), a physical uplink shared channel (PUSCH), or a physical uplink control channel (PUCCH).

Clause 88. The non-transitory computer-readable medium of any of clauses 85 to 87, wherein: the request comprises a request for a measurement gap, the time-domain parameters comprise a length and an offset of the no-downlink-scheduling gap, the length and the offset of the no-downlink-scheduling gap comprise a length and an offset of the measurement gap, and the request includes a flag indicating that the UE is permitted to transmit UL-PRS during the measurement gap.

Clause 89. The non-transitory computer-readable medium of any of clauses 85 to 88, wherein the request is included in a medium access control control element (MAC-CE).

Clause 90. The non-transitory computer-readable medium of any of clauses 85 to 89, wherein the one or more instructions further cause the UE to: remain in the one or more active BWPs for an entirety of the no-downlink-scheduling gap.

Clause 91. The non-transitory computer-readable medium of any of clauses 85 to 90, wherein the UE is not expected to perform radio resource management (RRM) measurements in the one or more active BWPs during the no-downlink-scheduling gap.

Clause 92. The non-transitory computer-readable medium of any of clauses 85 to 90, wherein the one or more instructions further cause the UE to: perform RRM measurements in the one or more active BWPs during the no-downlink-scheduling gap based on capabilities of the UE.

Clause 93. The non-transitory computer-readable medium of any of clauses 85 to 92, wherein the time-domain parameters comprise a length and an offset of the no-downlink-scheduling gap.

Clause 94. The non-transitory computer-readable medium of clause 93, wherein the length and the offset of the no-downlink-scheduling gap are each specified as a number of symbols, groups of symbols, or slots.

Clause 95. The non-transitory computer-readable medium of any of clauses 93 to 94, wherein the offset of the no-downlink-scheduling gap is defined with respect to a frame boundary, a subframe boundary, a slot boundary, a transmission time of the request, or any combination thereof.

Clause 96. The non-transitory computer-readable medium of any of clauses 85 to 95, wherein the no-downlink-scheduling gap is associated with at least one or more component carriers, frequency band indexes, or BWP indexes.

Clause 97. The non-transitory computer-readable medium of any of clauses 85 to 96, wherein the no-downlink-scheduling gap is associated with all component carriers, all frequency bands within at least Long-Term Evolution (LTE) or New Radio (NR), or all BWPs across all active component carriers of the UE.

Clause 98. The non-transitory computer-readable medium of any of clauses 85 to 97, wherein the one or more instructions further cause the UE to: request the no-downlink-scheduling gap based on a DL-PRS configuration for the neighboring base station received from a location server.

Clause 99. The non-transitory computer-readable medium of any of clauses 85 to 97, wherein the one or more instructions further cause the UE to: measure channel state information reference signal (CSI-RS) resources before the no-downlink-scheduling gap; cease any CSI-related processing of the CSI-RS resources during the no-downlink-scheduling gap; and drop a CSI report associated with the ceased CSI-related processing of the CSI-RS resources.

Clause 100. The non-transitory computer-readable medium of any of clauses 85 to 99, wherein the one or more instructions further cause the UE to: measure CSI-RS resources before the no-downlink-scheduling gap; and transmit, to the serving base station, a CSI report associated with the CSI-RS resources at least based on an extended CSI processing timeline, wherein the extended CSI processing timeline is a length of a CSI processing timeline extended by a length of the no-downlink-scheduling gap.

Clause 101. The non-transitory computer-readable medium of any of clauses 85 to 100, wherein the one or more instructions further cause the UE to: receive a physical downlink shared channel (PDSCH) before the no-downlink-scheduling gap; cease the PDSCH processing during the no-downlink-scheduling gap; and transmit, to the serving base station, a negative acknowledgment (NACK) for the PDSCH.

Clause 102. The non-transitory computer-readable medium of any of clauses 85 to 100, wherein the one or more instructions further cause the UE to: receive a PDSCH before the no-downlink-scheduling gap; and transmit, to the serving base station, an acknowledgment associated with the PDSCH at least based on an extended PDSCH processing timeline, wherein the extended PDSCH processing timeline is a length of a PDSCH processing timeline extended by a length of the no-downlink-scheduling gap.

Clause 103. A non-transitory computer-readable medium storing computer-executable instructions that, when executed by a base station, cause the base station to: receive, from a user equipment (UE), in one or more active bandwidth parts (BWPs) of the UE, a request for a no-downlink-scheduling gap, the request including at least time-domain parameters of the no-downlink-scheduling gap; and refrain from transmitting to the UE during the no-downlink-scheduling gap.

Clause 104. The non-transitory computer-readable medium of clause 103, wherein: the request comprises a request for a measurement gap, the time-domain parameters comprise a length and an offset of the no-downlink-scheduling gap, the length and the offset of the no-downlink-scheduling gap comprises a length and an offset of the measurement gap, and the request includes a flag indicating that the UE is permitted to transmit UL-PRS during the measurement gap.

Clause 105. The non-transitory computer-readable medium of any of clauses 103 to 104, wherein the request is included in a medium access control control element (MAC-CE).

Clause 106. The non-transitory computer-readable medium of any of clauses 103 to 105, wherein the time-domain parameters comprise a length and an offset of the no-downlink-scheduling gap.

Clause 107. The non-transitory computer-readable medium of clause 106, wherein the length and the offset of the no-downlink-scheduling gap are each specified as a number of symbols, groups of symbols, or slots.

Clause 108. The non-transitory computer-readable medium of any of clauses 106 to 107, wherein the offset of the no-downlink-scheduling gap is defined with respect to a frame boundary, a subframe boundary, a slot boundary, a transmission time of the request, or any combination thereof.

Clause 109. The non-transitory computer-readable medium of any of clauses 103 to 108, wherein the no-downlink-scheduling gap is associated with at least one or more component carriers, frequency band indexes, or BWP indexes.

Clause 110. The non-transitory computer-readable medium of any of clauses 103 to 109, wherein the no-downlink-scheduling gap is associated with all component carriers, all frequency bands, or all BWPs across all active component carriers of the UE.

Clause 111. The non-transitory computer-readable medium of any of clauses 103 to 110, wherein the one or more instructions further cause the base station to: transmit, to the UE, before the no-downlink-scheduling gap, channel state information reference signal (CSI-RS) resources for a CSI report; and receive the CSI report from the UE after the no-downlink-scheduling gap, a CSI processing timeline within which the UE is permitted to transmit the CSI report having been extended by a length of the no-downlink-scheduling gap.

Clause 112. The non-transitory computer-readable medium of any of clauses 103 to 111, wherein the one or more instructions further cause the base station to: transmit, to the UE, before the no-downlink-scheduling gap, a physical downlink shared channel (PDSCH); and receive, from the UE, an acknowledgment for the PDSCH after the no-downlink-scheduling gap, a PDSCH processing timeline in which the UE is permitted to transmit the acknowledgment having been extended by a length of the no-downlink-scheduling gap.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    determining a configuration of a no-downlink-scheduling gap for one or more bandwidth parts (BWPs) of the UE, the no-downlink-scheduling gap comprising at least time-domain parameters related to scheduling the no-downlink-scheduling gap; and
    receiving, from a neighboring base station, in the one or more BWPs, a downlink positioning reference signal (DL-PRS) during the no-downlink-scheduling gap, wherein:
        the UE does not receive any downlink transmissions from a serving base station during the no-downlink-scheduling gap inside the one or more BWPs, or
        the UE ignores any downlink transmissions from the serving base station during the no-downlink-scheduling gap in the one or more BWPs, or
        the UE prioritizes DL-PRS processing over any other downlink transmissions from the serving base station during the no-downlink-scheduling gap in the one or more BWPs, and
    transmitting, in the one or more BWPs, an uplink positioning reference signal during the no-downlink-scheduling gap.

2. The method of claim 1, wherein the uplink positioning reference signal comprises a sounding reference signal (SRS) for positioning, an SRS configured at least for communication purposes, a demodulation reference signal (DMRS), a physical uplink shared channel (PUSCH), or a physical uplink control channel (PUCCH).

3. The method of claim 1, wherein determining the configuration of the no-downlink-scheduling gap comprises:
    transmitting, to the serving base station, in the one or more BWPs, a request for the no-downlink-scheduling gap, the request including at least the time-domain parameters related to scheduling the no-downlink-scheduling gap; and
    receiving, from the serving base station, the configuration of the no-downlink-scheduling gap.

4. The method of claim 1, wherein the request is included in a medium access control control element (MAC-CE).

5. The method of claim 1, further comprising:
    remaining in the one or more BWPs for an entirety of the no-downlink-scheduling gap.

6. The method of claim 1, wherein the UE is not expected to perform radio resource management (RRM) measurements in the one or more BWPs during the no-downlink-scheduling gap.

7. The method of claim 1, further comprising:
    performing RRM measurements in the one or more BWPs during the no-downlink-scheduling gap based on capabilities of the UE.

8. The method of claim 1, wherein the time-domain parameters comprise a length and an offset of the no-downlink-scheduling gap.

9. The method of claim 8, wherein the length and the offset of the no-downlink-scheduling gap are each specified as a number of symbols, groups of symbols, or slots.

10. The method of claim 8, wherein the offset of the no-downlink-scheduling gap is defined with respect to a frame boundary, a subframe boundary, a slot boundary, a transmission time of the request, or any combination thereof.

11. The method of claim 1, wherein the no-downlink-scheduling gap is associated with at least one or more component carriers, frequency band indexes, or BWP indexes.

12. The method of claim 1, wherein the no-downlink-scheduling gap is associated with all component carriers, all frequency bands within at least Long-Term Evolution (LTE) or New Radio (NR), or all BWPs across all active component carriers of the UE.

13. The method of claim 1, further comprising:
requesting the no-downlink-scheduling gap based on a DL-PRS configuration for the neighboring base station received from a location server.

14. The method of claim 1, further comprising:
measuring channel state information reference signal (CSI-RS) resources before the no-downlink-scheduling gap;
ceasing any CSI-related processing of the CSI-RS resources during the no-downlink-scheduling gap; and
dropping a CSI report associated with the ceased CSI-related processing of the CSI-RS resources.

15. The method of claim 1, further comprising:
measuring CSI-RS resources before the no-downlink-scheduling gap; and
transmitting, to the serving base station, a CSI report associated with the CSI-RS resources at least based on an extended CSI processing timeline, wherein the extended CSI processing timeline is a length of a CSI processing timeline extended by a length of the no-downlink-scheduling gap.

16. The method of claim 1, further comprising:
receiving a physical downlink shared channel (PDSCH) before the no-downlink-scheduling gap;
ceasing the PDSCH processing during the no-downlink-scheduling gap; and
transmitting, to the serving base station, a negative acknowledgment (NACK) for the PDSCH.

17. The method of claim 1, further comprising:
receiving a PDSCH before the no-downlink-scheduling gap; and
transmitting, to the serving base station, an acknowledgment associated with the PDSCH at least based on an extended PDSCH processing timeline, wherein the extended PDSCH processing timeline is a length of a PDSCH processing timeline extended by a length of the no-downlink-scheduling gap.

18. A method of wireless communication performed by a base station, comprising:
receiving a request for a no-downlink-scheduling gap for a user equipment (UE) associated with one or more active bandwidth parts (BWPs), the request including at least time-domain parameters of the no-downlink-scheduling gap, wherein:
the request comprises a request for a measurement gap,
the time-domain parameters comprise a length and an offset of the no-downlink-scheduling gap,
the length and the offset of the no-downlink-scheduling gap comprises a length and an offset of the measurement gap, and
the request includes a flag indicating that the UE is permitted to transmit uplink positioning reference signals (UL-PRS) during the measurement gap; and
refraining from transmitting to the UE during the no-downlink-scheduling gap.

19. The method of claim 18, wherein the request is included in a medium access control control element (MAC-CE).

20. The method of claim 18, wherein the time-domain parameters comprise a length and an offset of the no-downlink-scheduling gap.

21. The method of claim 20, wherein the length and the offset of the no-downlink-scheduling gap are each specified as a number of symbols, groups of symbols, or slots.

22. The method of claim 20, wherein the offset of the no-downlink-scheduling gap is defined with respect to a frame boundary, a subframe boundary, a slot boundary, a transmission time of the request, or any combination thereof.

23. The method of claim 18, wherein the no-downlink-scheduling gap is associated with at least one or more component carriers, frequency band indexes, or BWP indexes.

24. The method of claim 18, wherein the no-downlink-scheduling gap is associated with all component carriers, all frequency bands, or all BWPs across all active component carriers of the UE.

25. The method of claim 18, further comprising:
transmitting, to the UE, before the no-downlink-scheduling gap, channel state information reference signal (CSI-RS) resources for a CSI report; and
receiving the CSI report from the UE after the no-downlink-scheduling gap, a CSI processing timeline within which the UE is permitted to transmit the CSI report having been extended by a length of the no-downlink-scheduling gap.

26. The method of claim 18, further comprising:
transmitting, to the UE, before the no-downlink-scheduling gap, a physical downlink shared channel (PDSCH); and
receiving, from the UE, an acknowledgment for the PDSCH after the no-downlink-scheduling gap, a PDSCH processing timeline in which the UE is permitted to transmit the acknowledgment having been extended by a length of the no-downlink-scheduling gap.

27. A user equipment (UE), comprising:
a memory;
at least one transceiver; and
at least one processor communicatively coupled to the memory and the at least one transceiver, the at least one processor configured to:
determine a configuration of a no-downlink-scheduling gap for one or more bandwidth parts (BWPs) of the UE, the no-downlink-scheduling gap comprising at least time-domain parameters related to scheduling the no-downlink-scheduling gap; and
receive, via the at least one transceiver, from a neighboring base station, in the one or more BWPs, a downlink positioning reference signal (DL-PRS) during the no-downlink-scheduling gap, wherein:
the UE does not receive any downlink transmissions from a serving base station during the no-downlink-scheduling gap inside the one or more BWPs, or the UE ignores any downlink transmissions from the serving base station during the no-downlink-scheduling gap in the one or more BWPs, or the UE prioritizes DL-PRS processing over any other downlink transmissions from the serving base station during the no-downlink-scheduling gap in the one or more BWPs, and transmit, via the at least one transceiver, in the one or more BWPs, an uplink positioning reference signal during the no-downlink-scheduling gap.

28. A base station, comprising:

a memory;

at least one transceiver; and at least one processor communicatively coupled to the memory and the at least one transceiver, the at least one processor configured to:

receive a request for a no-downlink-scheduling gap for a user equipment (UE) associated with one or more active bandwidth parts (BWPs), the request including at least time-domain parameters of the no-downlink-scheduling gap, wherein:

the request comprises a request for a measurement gap, the time-domain parameters comprise a length and an offset of the no-downlink-scheduling gap, the length and the offset of the no-downlink-scheduling gap comprises a length and an offset of the measurement gap, and the request includes a flag indicating that the UE is permitted to transmit uplink positioning reference signals (UL-PRS) during the measurement gap; and refrain from transmitting to the UE during the no-downlink-scheduling gap.

* * * * *